US007539732B2

(12) United States Patent
Kelso et al.

(10) Patent No.: US 7,539,732 B2
(45) Date of Patent: May 26, 2009

(54) CLIENT BASED INSTANT MESSENGER QUEUE LIMIT

(75) Inventors: Scott Edwards Kelso, Durham, NC (US); Nathan J. Peterson, Raleigh, NC (US); Rod David Waltermann, Durham, NC (US); Arnold S. Weksler, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 10/941,337

(22) Filed: Sep. 15, 2004

(65) Prior Publication Data
US 2006/0075029 A1    Apr. 6, 2006

(51) Int. Cl.
G06F 15/16    (2006.01)

(52) U.S. Cl. ...................................................... 709/206

(58) Field of Classification Search ................. 709/206, 709/207
See application file for complete search history.

(56) References Cited

U.S. PATENT DOCUMENTS

| | | | | |
|---|---|---|---|---|
| 4,222,644 | A | 9/1980 | Tano et al. | 396/292 |
| 5,793,365 | A | 8/1998 | Tang et al. | 715/758 |
| 5,915,133 | A | 6/1999 | Hirai et al. | 396/48 |
| 5,960,173 | A | 9/1999 | Tang et al. | 709/201 |
| 6,338,089 | B1 * | 1/2002 | Quinlan | 709/227 |
| 6,346,952 | B1 * | 2/2002 | Shtivelman | 715/758 |
| 6,519,639 | B1 | 2/2003 | Glasser et al. | 709/224 |
| 6,630,944 | B1 | 10/2003 | Kakuta et al. | 715/758 |
| 6,677,976 | B2 | 1/2004 | Parker et al. | 348/14.08 |
| 6,707,890 | B1 | 3/2004 | Gao et al. | 379/88.12 |
| 6,769,013 | B2 | 7/2004 | Frees et al. | 709/205 |
| 6,938,213 | B2 | 8/2005 | Brown et al. | 715/758 |
| 6,981,223 | B2 | 12/2005 | Becker et al. | 715/753 |
| 6,983,305 | B2 | 1/2006 | Danker et al. | 709/204 |
| 7,020,878 | B1 * | 3/2006 | Rhee et al. | 718/104 |
| 7,100,116 | B1 | 8/2006 | Shafrir et al. | 715/751 |
| 7,103,846 | B1 | 9/2006 | Shafrir et al. | 715/751 |
| 7,111,044 | B2 | 9/2006 | Lee | 709/204 |
| 7,124,110 | B1 * | 10/2006 | Kemp et al. | 705/37 |
| 7,133,923 | B2 * | 11/2006 | MeLampy et al. | 709/231 |
| 7,139,797 | B1 | 11/2006 | Yoakum et al. | 709/204 |
| 7,159,178 | B2 | 1/2007 | Vogt et al. | 715/733 |

(Continued)

OTHER PUBLICATIONS

Tang et al., "Beyond Instant Messaging," *Queue*, Nov. 2003, p. 29-37.

(Continued)

*Primary Examiner*—William C Vaughn, Jr.
*Assistant Examiner*—Thomas Richardson
(74) *Attorney, Agent, or Firm*—VanLeeuwen & VanLeeuwen; Robert E. Straight

(57) ABSTRACT

The number of concurrent instant messaging sessions at a given time is limited. A user may configure the number of instant messaging sessions that are allowed at a given time. When a new request for an instant messaging session is received, a determination is made as to whether there are already the maximum number of allowed sessions. If the maximum number of sessions has been reached, the requestor receives a message indicating that the user is currently busy with other instant messaging sessions and inviting the requestor to join the queue. If the requestor joins the queue, then the requestor moves up in the queue when one of the user's instant messaging sessions terminate.

12 Claims, 20 Drawing Sheets

U.S. PATENT DOCUMENTS

| | | | |
|---|---|---|---|
| 7,162,540 B2* | 1/2007 | Jasen et al. | 709/242 |
| 7,177,917 B2* | 2/2007 | Giotta | 709/219 |
| 7,197,049 B2* | 3/2007 | Engstrom et al. | 370/469 |
| 7,200,635 B2 | 4/2007 | Yashchin et al. | 709/206 |
| 7,277,131 B2 | 10/2007 | Wakabayashi | 348/333.02 |
| 7,281,215 B1* | 10/2007 | Canfield et al. | 715/752 |
| 7,328,242 B1 | 2/2008 | McCarthy et al. | 709/204 |
| 7,360,164 B2 | 4/2008 | Bjoernsen et al. | 715/751 |
| 2002/0021307 A1 | 2/2002 | Glenn et al. | 345/753 |
| 2002/0089537 A1 | 7/2002 | Balasubramanian | 345/751 |
| 2002/0174260 A1 | 11/2002 | Huang | 709/313 |
| 2003/0030670 A1* | 2/2003 | Duarte et al. | 345/758 |
| 2003/0126207 A1 | 7/2003 | Creamer | 709/204 |
| 2003/0154293 A1 | 8/2003 | Zmolek | 709/228 |
| 2003/0210265 A1 | 11/2003 | Haimberg | 345/758 |
| 2003/0235287 A1 | 12/2003 | Margolis | 379/265.01 |
| 2004/0003090 A1 | 1/2004 | Deeds | 709/227 |
| 2004/0006625 A1* | 1/2004 | Saha et al. | 709/227 |
| 2004/0006711 A1* | 1/2004 | Krishnaswamy et al. | 713/201 |
| 2004/0017396 A1 | 1/2004 | Werndorfer et al. | 345/751 |
| 2004/0145608 A1 | 7/2004 | Fay et al. | 345/758 |
| 2005/0039134 A1 | 2/2005 | Wiggeshoff et al. | 715/752 |
| 2005/0080848 A1* | 4/2005 | Shah | 709/204 |
| 2005/0114781 A1 | 5/2005 | Brownholtz et al. | 715/733 |
| 2005/0149545 A1 | 7/2005 | Zenz | 707/101 |
| 2005/0149621 A1 | 7/2005 | Kirkland et al. | 709/207 |

OTHER PUBLICATIONS

Office Action, made final, for U.S. Appl. No. 10/941,336, mailed Aug. 19, 2008, 11 pages.

Notice of allowance for U.S. Appl. No. 10/941,334, mailed Oct. 15, 2008, 11 pages.

* cited by examiner

CLIENT BASED INSTANT MESSENGER QUEUE LIMIT

BACKGROUND OF THE INVENTION

1. Technical Field

The present invention relates in general to a system and method for providing an instant messaging queue. In particular, the present invention relates to a system and method for limiting the number of active instant messaging sessions and queuing sessions over such maximum to a wait queue.

2. Description of the Related Art

Instant messaging has become a critical communications technology for many users and organizations. Instant messaging allows a user to create a "session" with one or more other users so that messages can be sent back and forth contemporaneously. The flow of messages in an instant message session creates a dialog between the user and other users with whom the user has established a session. In this manner, quick messages can be transmitted without sending an email message or telephoning the other user. Users can choose whether and when to respond to instant messages, much like an email message. However, unlike email messages, in instant messaging, a window is displayed on the user's display showing the messages between the user and another user.

Initially, instant messaging applications were perceived as an informal means for family and friends to chat online. However, businesses and other professional organizations have quickly adopted instant messaging as a key tool for business communications. Conference call attendees often engage in instant messaging sessions with certain people in the conference call or with other people not attending the conference call. These instant messaging sessions often allow the attendee to ask questions that would not be made verbally on the conference call, enabling conference calls attendee to be more informed and efficient.

Another use of instant messaging is providing technical support or assistance to others. In this regard, instant messaging is often preferred over telephone or email communications. The advantage of instant messaging over using the telephone is that, using instant messaging, one technician can provide assistance simultaneously to multiple parties, while using telephones would generally serialize the communication so that only one person could be assisted at a time. In addition, with many types of technical assistance, there are often delays that are incurred while the person receiving assistance performs various functions. Using instant messaging, these delays can be utilized to help others, while using the telephone these delays simply lengthen the amount of time before the next person can be assisted.

When providing assistance, either technical or otherwise, instant messaging is often preferred over email because of the "back and forth" nature of the instant messaging communication that generally makes the flow of information more efficient than using email. Often times the technician may need background, system, or other information to understand the nature of the problem and be able to suggest a course of action. Using instant messaging, the background, courses of action, and effectiveness of the various actions can be ascertained within a single instant messaging session. Using email, communicating this same "back and forth" information may take several separate email messages.

While instant messaging has distinct advantages over other forms of communication, it is not without its challenges. In traditional instant messaging applications, a virtually unlimited number of instant messaging sessions are possible with a virtually unlimited number of parties.

Having large numbers of instant messaging sessions may, in some cases, be "too much of a good thing," and cause confusion and information overload for the user. This challenge is further exacerbated by the fact that the sender for each of the instant messaging sessions is unaware of the number of instant messaging sessions that the receiver has open. For example, if a computer help desk operator has 30 people that open instant messaging sessions in order to receive help, the operator can quickly become overwhelmed and be unable to efficiently and accurately help all of the requesters. At the same time, the requestors do not realize that the operator is currently trying to help 30 people and may become upset when the operator delays in answering their questions posed in their instant messaging sessions. In addition, the requesters may receive inaccurate information or suggestions from the operator due to the fact that the operator is trying to help too many people at the same time. This can further anger and frustrate the users that the operator is trying to help.

What is needed, therefore, is a system and method that limits the number of simultaneous instant messaging sessions and queues requests that surpass the limit. In addition, what is also needed is a system and method that informs requesters of the number of current instant messaging sessions.

SUMMARY

It has been discovered that the aforementioned challenges are resolved using a method that limits the number of concurrent instant messaging sessions at a given time. The method allows a user to configure the number of instant messaging sessions that are allowed at a given time. When a new request for an instant messaging session is received, a determination is made as to whether there are already the maximum number of allowed sessions. If the maximum number of sessions has been reached, the requestor receives a message indicating that the user is currently busy with other instant messaging sessions and inviting the requester to join the queue.

If the requester joins the queue, then the requestor moves up in the queue when the user's instant messaging sessions terminate. In one embodiment, the requester is informed as to how many active sessions the user is allowing. Also in one embodiment, the requestor is informed as to his or her position in the queue so that the requestor might have a general idea of how long the wait might be before an active session is provided between the requester and the user. In addition, in one embodiment if the requestor does not wish to join the queue, the requester is given the opportunity to leave a message for the user. The user is then informed that the requester has left a message and can view the message accordingly.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
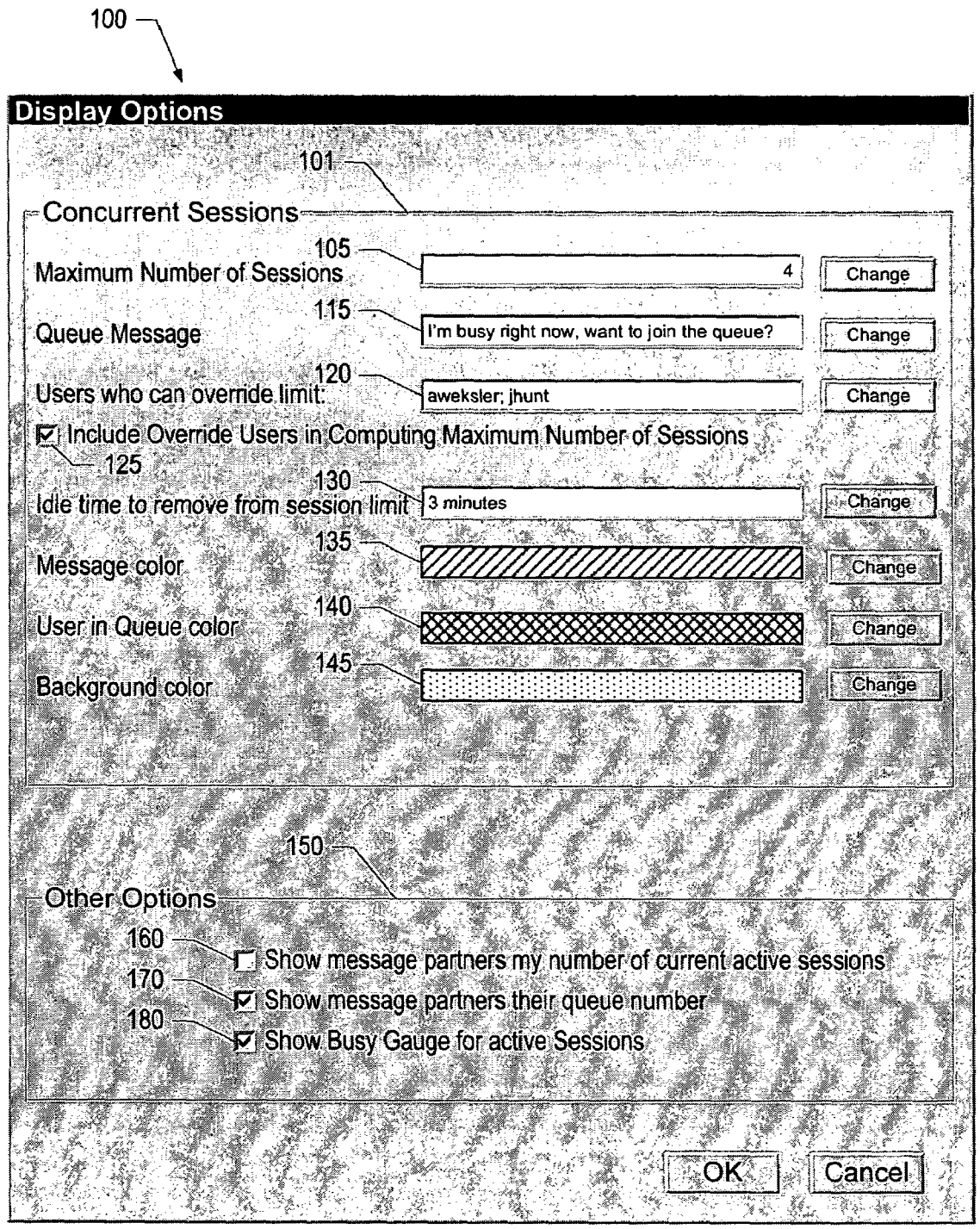
FIG. 1 is a screen layout showing configuration options available to the user.

FIG. 1 is a screen layout showing configuration options available to the user. Display window 100 is divided into two frames: frame 101 is used as a container for options related to concurrent sessions, and frame 150 is used as a container for other options.

Frame 101 includes textbox 105 into which the user enters the maximum number of active instant messaging sessions that are allowed. In the example shown, the user has entered "4" as the number of sessions allowed. Frame 101 also includes textbox 115 for entering the message that will be sent to a instant messaging partner when there the number of allowable active sessions has been reached. In the example shown, the user has entered "I'm busy right now, want to join the queue?" into textbox 115.

Textbox 120 is used to enter the identifiers (i.e., user IDs) of message partners that are allowed to supersede, or override, the session limit. In the example shown, two users have been entered. If the user's instant messaging session limit has been reached and either of the partners listed in textbox 120 requests an instant messaging session, an instant messaging session is opened even though the user's instant messaging session limit has been reached. Option 125 is a flag that indicates whether sessions with users that are allowed to override session limits are included in the user's session counts. In the example shown, the option has been selected, so if the user has one session with one of the partners listed in textbox 120 and three other sessions with three other partners, then the maximum number of sessions has been reached. However, if the option is not selected, then the session with the partner listed in textbox 120 is not counted toward the session limit.

Textbox 130 is where the user enters the amount of idle time-until a session is considered inactive. In the example shown, the user has entered three minutes. If an active session is idle for three minutes, then it is considered idle and, if one or more partners are waiting for a session, a new session is opened with one of the waiting partners. Text boxes 135, 140, and 145 are used to show the message color, waiting partner color, and background color, respectively.

Other options frame 150 is used for the user to select three options. Option 160 indicates whether the number of current active sessions with the user's session partners. For example, if the option is selected and the user currently has three instant messaging sessions, then each of the instant messaging partners is informed that the user currently has three instant messaging sessions. In the example shown, however, the options is not selected so this information will not be provided to the user's instant messaging partners.

Option 170 is used to choose whether partners that are waiting for an instant messaging session are informed of their position in the user's queue. In the example shown, the option has been selected so waiting partners are provided with this information.

Option 180 is used by the user to select whether a busy gauge is displayed for instant messaging partners with whom an active instant messaging session is initiated. In the example shown, the option has been selected so busy gauges are shown for the active message partners. For examples of busy gauges, see the window shown in FIG. 4.

Figure 2:
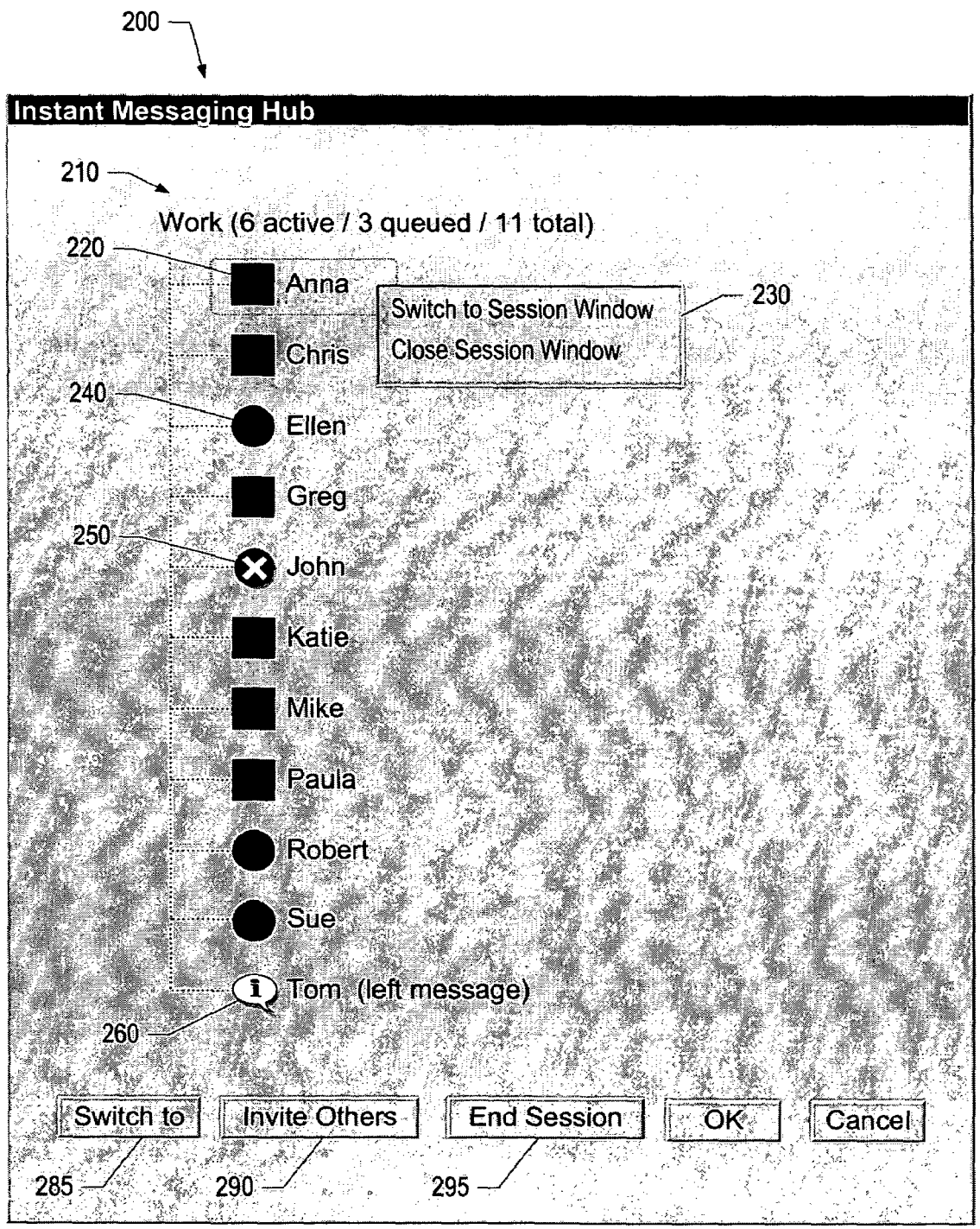
FIG. 2 is a screen layout showing a user's instant messaging hub of active and queued users.

FIG. 2 is a screen layout showing a user's instant messaging hub of active and queued users. Instant messaging hub window 200 includes information about the user's instant messaging partners and their current status. Summary 210 shows that the name of the instant messaging hub is "work" and that the user currently has six active sessions, three partners are waiting for an instant messaging session, and that there are 11 total partners in the hub. Node 220 is shown being selected. This node corresponds to an active user, as indicated by the square icon. Context menu 230 has been opened and shows that the user can either switch to the instant messaging session or close the instant messaging session. Node 240 corresponds to a waiting partner, as indicated by the circle icon.

Node 250 corresponds to a partner that is unavailable, as indicated by the "x" icon. Finally, node 260 corresponds to a partner that has left a message for the user rather than wait in the wait queue, as indicated by the "information" icon.

Command buttons 285, 290, and 295 are used to perform various actions. When a user has been selected and command button 285 is clicked, then the display switches to display the window with the corresponding instant messaging session.

Command button 290 is used by the user to invite others to be instant messaging partners or to initiate an instant messaging session with a user that is not yet an instant messaging partner. When a user has been selected and command button 295 is clicked, then the instant messaging session with the selected partner is terminated.

Figure 3:
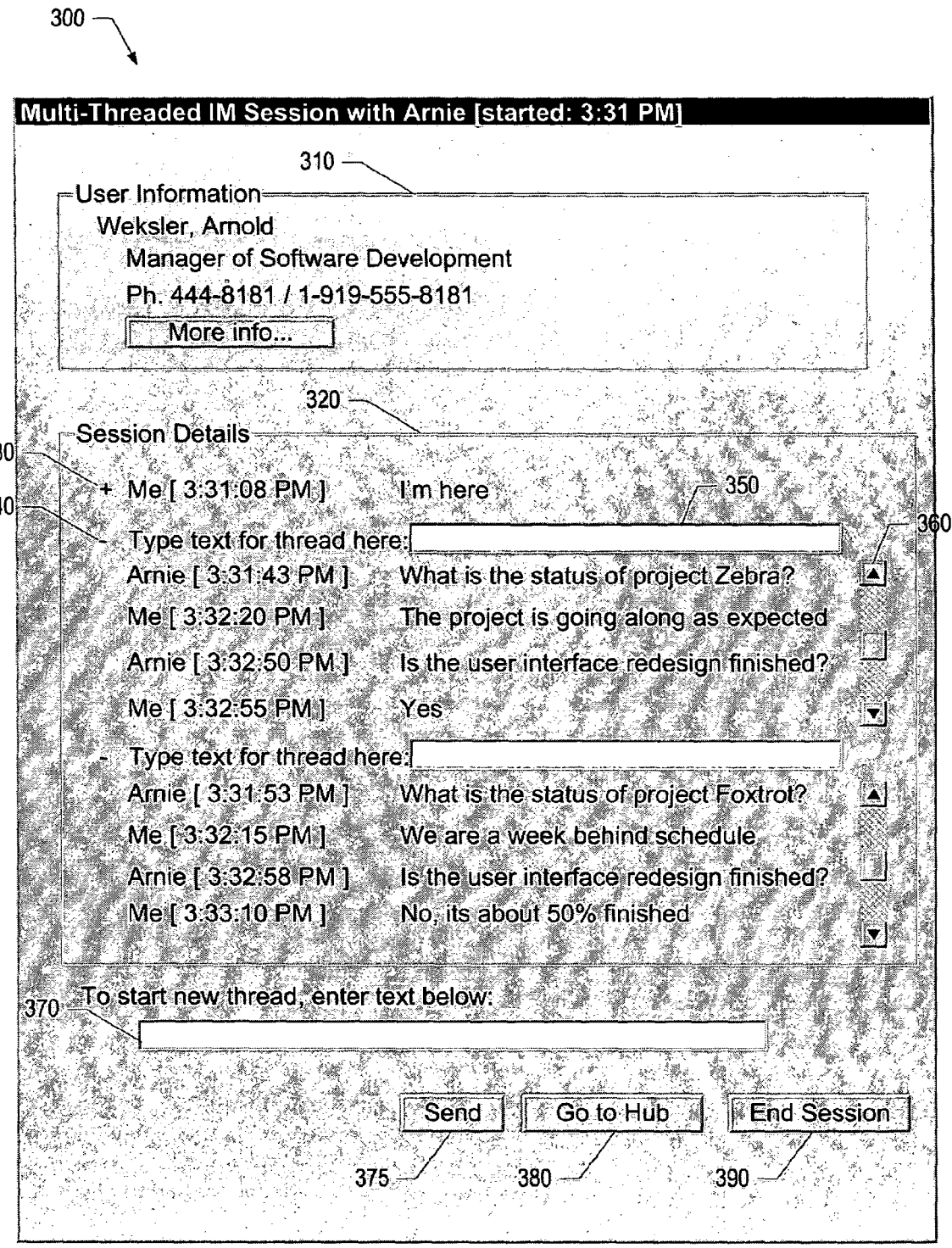
FIG. 3 is a screen layout showing an embodiment of providing multiple discussion threads in a single instant messaging session.

FIG. 3 is a screen layout showing an embodiment of providing multiple discussion threads in a single instant messaging session. Multi-threaded instant messaging session window 300 includes user information 310, session details 320, and new thread input box 370. User information 310 includes information about the session partner with whom the multi-threaded instant messaging session is being conducted. A command button is included to view more information about the session partner.

Session details 320 includes the text sent between the user and the session partner. Conversation thread 330 is shown as being collapsed with a single line from the thread being displayed. The user can select the plus sign (+) next to the thread to expand the conversation thread to view the other messages within the thread.

Conversation thread 340 is shown as being expanded with multiple messages being displayed in a sub-window that is scrollable using scroll bar 360. Textbox 350 is used by the user to enter a new message that will be included in this conversation thread. The user can select the minus sign(−) next to the thread to collapse the conversation thread and hide all but one of the messages in the thread.

New textbox 370 is used to start a new conversation thread. When the user enters a message in new textbox 370, a new thread is created and displayed in session details 320. Command button 375 is used to send a message. In addition, in one embodiment the user can enter text in one of the textboxes and press the enter key to send the message. Command button 380 is used to display the hub display, such as that shown in FIGS. 2 and 4. Finally, command button 390 is used to end the multi-threaded instant messaging session.

Figure 4:
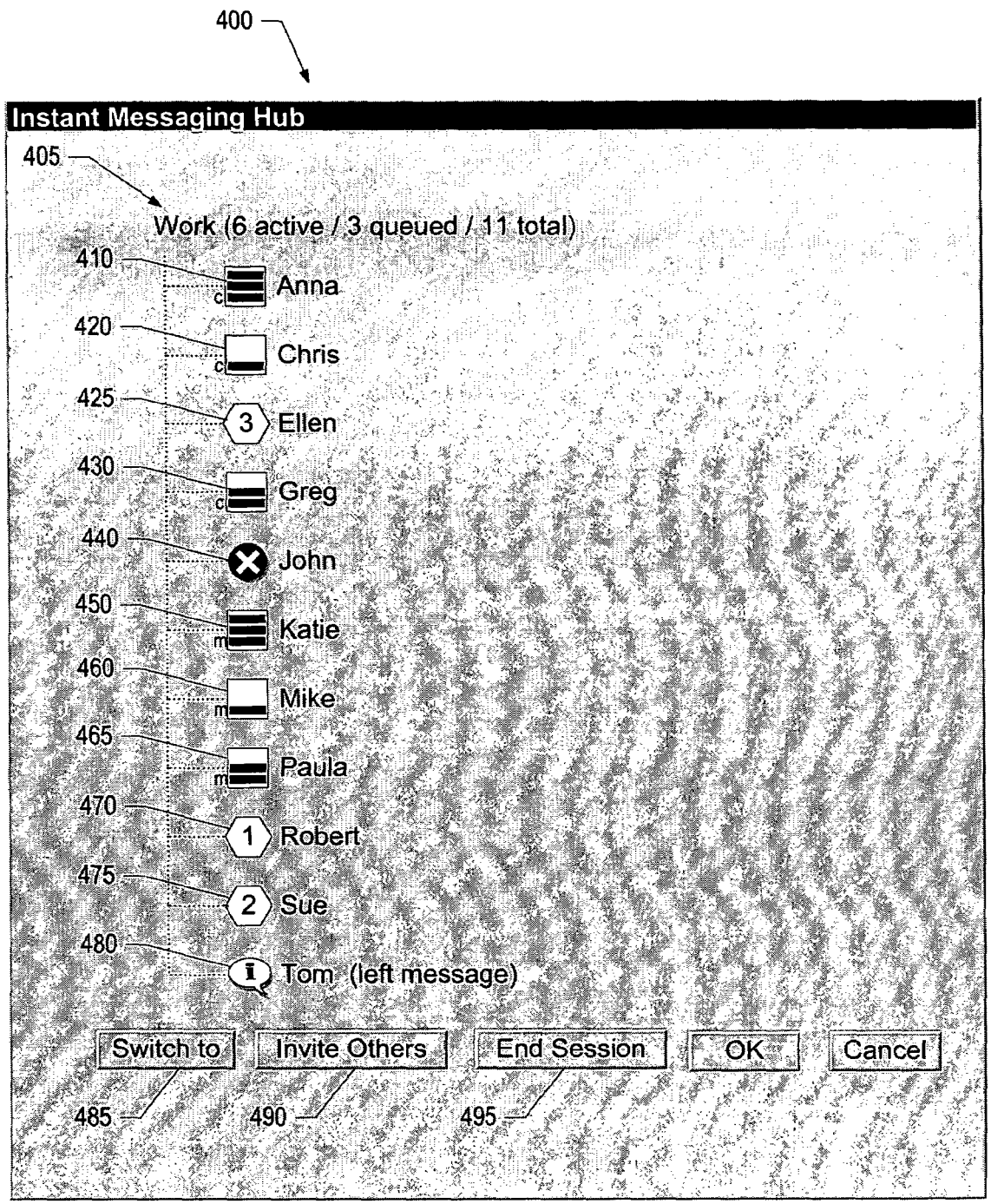
FIG. 4 is a screen layout showing a user's instant messaging hub of active and queued users along with busy gauge indicators for active participants and queue numbers for parties waiting to establish an instant messaging session.

FIG. 4 is a screen layout showing a user's instant messaging hub of active and queued users along with busy gauge indicators for active participants and queue numbers for parties waiting to establish an instant messaging session. The hub display in FIG. 4 is similar to that shown in FIG. 2. Window 400 includes summary 405 that shows that there are 11 message partners, six of whom have active instant messaging sessions and three of whom are waiting to have instant messaging sessions. In FIG. 4, more information is provided for each of the message partners.

Active sessions are shown in nodes 410, 420, 430, 450, 460, and 465 and each has a busy gauge that indicates the activity level of the respective instant messaging partner. Some of the busy gauges have a small "c" indicating that the partner's activity level was automatically computed and others have a small "m" indicating that the partner manually set the partner's activity level. The busy gauges each have one or more horizontal bars to indicate the activity level of the respective partner. Three bars indicate a partner that has a high current activity level, two bars indicating a medium activity level, and one bar indicating a low activity level.

Partners that are currently waiting for an instant messaging session are indicated by hexagons and are shown in nodes 425, 470, and 475. The position of each of these partners in the wait queue is indicated by the number that is displayed within the icon (i.e., "1," "2," and "3").

Node 440 is shown as being inactive. This is indicated by the "x" icon. Node 480 is shown as having left a message, as indicated by the "information" icon.

Command buttons 285, 290, and 295 are used to perform various actions. When a user has been selected and command button 285 is clicked, then the display switches to display the window with the corresponding instant messaging session. Command button 290 is used by the user to invite others to be instant messaging partners or to initiate an instant messaging session with a user that is not yet an instant messaging partner. When a user has been selected and command button 295 is clicked, then the instant messaging session with the selected partner is terminated.

Figure 5:
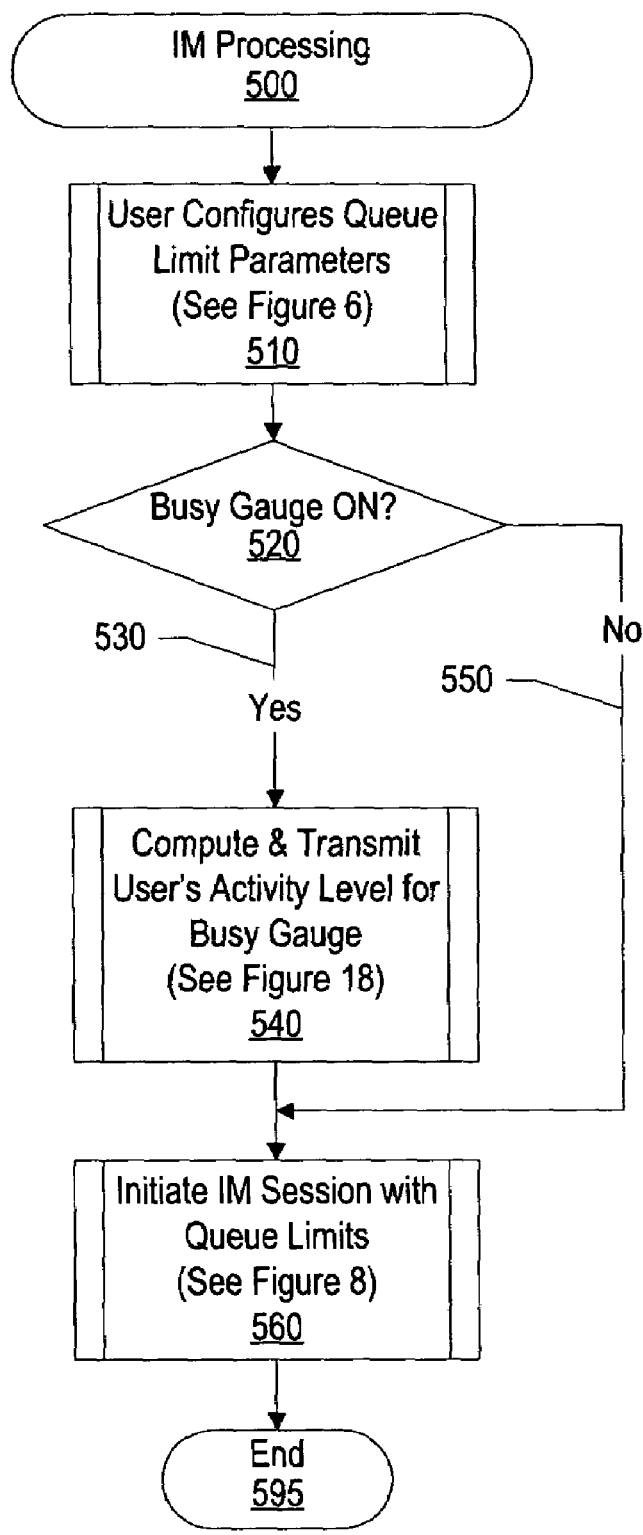
FIG. 5 is a high level flowchart of an instant messaging application providing queue limits and busy gauge indicators.

FIG. 5 is a high level flowchart of an instant messaging application providing queue limits and busy gauge indicators. Instant messaging application processing commences at 500 whereupon, at step 510, the user configures the instant messaging queue limit parameters, such as the maximum number of instant messaging sessions to allow at a given time (predefined process 510, see FIG. 6 and corresponding text for processing details).

The instant messaging application determines whether the busy gauge has been activated by the user (decision 520). If the busy gauge has been activated, decision 520 branches to "yes" branch 530 whereupon the user's activity level is determined in order to transmit the busy gauge to the user's instant messaging session partners (predefined process 540, see FIG. 18 and corresponding text for processing details). On the other hand, if the busy gauge has been turned off, decision 520 branches to "no" branch 550 bypassing predefined process 540.

Figure 8:
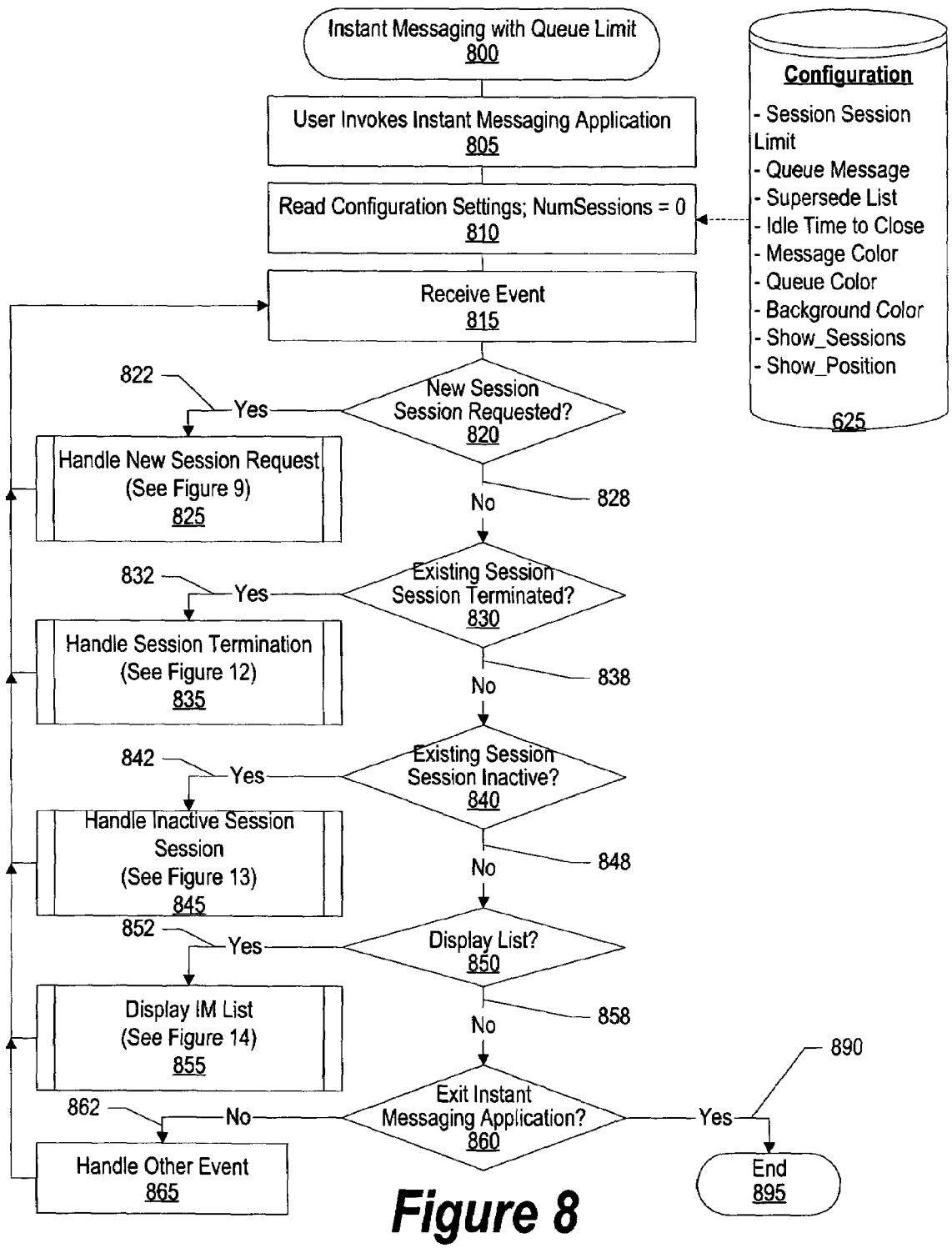
FIG. 8 is a flowchart showing the steps taken in executing an instant messaging application with a queue limit.

At predefined process 560, instant messaging sessions are initiated with the queue limits and other configuration settings set by the user (see FIG. 8 and corresponding text for processing details). Instant messaging processing thereafter terminates at 595.

Figure 6:
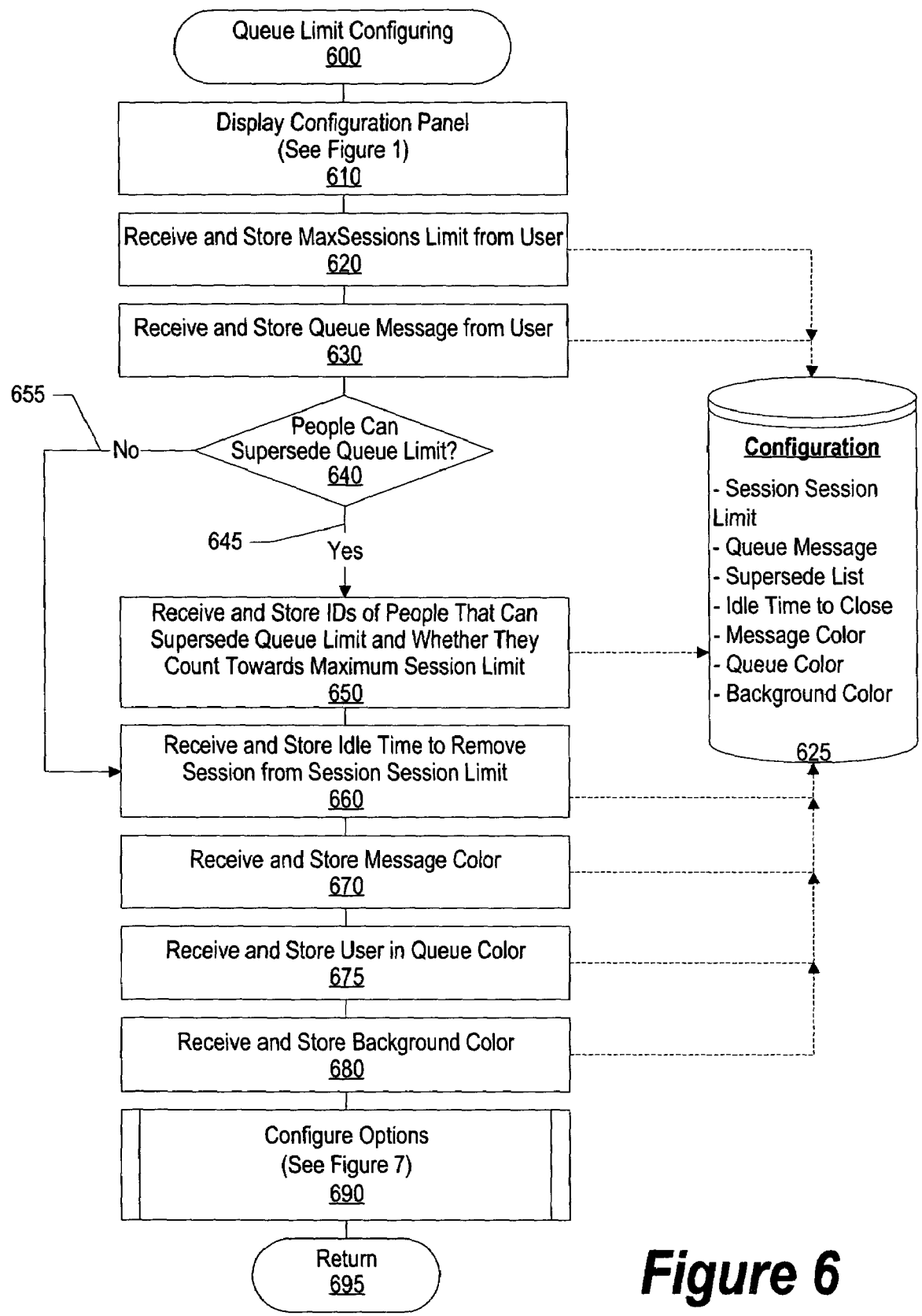
FIG. 6 is a flowchart showing steps taken in configuring limits on the number of partners allowed in a user's instant messaging application.

FIG. 6 is a flowchart showing steps taken in configuring limits on the number of partners allowed in a user's instant messaging application. Configuration processing commences at 600 whereupon, at step 610 the configuration panel is displayed to the user (see FIG. 1 and corresponding text for details regarding the configuration panel). At step 620, the maximum number of active instant messaging sessions allowed by the user is stored in configuration data store 625. At step 630, the queue message is received from the user and stored in configuration data store 625. The queue message is a message that is sent to a user that is requesting an instant messaging session when the maximum number of session limits has already been met. The queue message typically invites the requestor to join a queue to wait for an available instant messaging session.

A determination is made as to whether the user has identified any users that can supersede the maximum session limit (decision 640). Using the example shown in FIG. 1, the user is allowing a maximum of four instant messaging sessions at a time. However, the user has identified two users that can supersede this limit. If the user currently has four active sessions and one of the identified users requests an instant messaging session, the instant messaging session is activated even though the maximum number of sessions has already been met. Returning to FIG. 6, if the user identified users that can supersede the session limits, decision 640 branches to "yes" branch 645 whereupon, at step 650, the identifiers (e.g., UserIDs) of the users that are allowed to supersede are retrieved and stored in configuration data store 625. On the other hand, if the user did not identify any users that can supersede the allowed number of sessions, decision 640 branches to "no" branch 655 bypassing step 650.

At step 660, an "idle time" is received and stored in configuration data store 625. In one embodiment, when the idle time limit expires the idle session is no longer counted towards the maximum number of sessions that are allowed at a given time. Using the example shown in FIG. 1, when a session has been idle for three minutes, the session is considered to be inactive and, if another user is waiting to have an instant messaging session, a new instant messaging session is opened to accommodate the waiting user. In this example, there would actually be five active instant messaging sessions rather than the normal allowed maximum of four. In an alternate embodiment, the idle time limit can be used to terminate an idle session that has not been used for a certain amount of time. Consequently, in this alternate embodiment, the maximum number of active instant messaging sessions is not altered by idle sessions as such idle sessions are terminated rather than remaining as active sessions.

Various color settings are received and stored in steps 670, 675, and 680. The message color of the messages received in an instant messaging session is received and stored in step 670. At step 675, the user in queue color is stored. This color is used to indicate which users are currently waiting for an instant messaging session with the user. The background color for the user's instant messaging session is received and stored at step 680.

Figure 7:
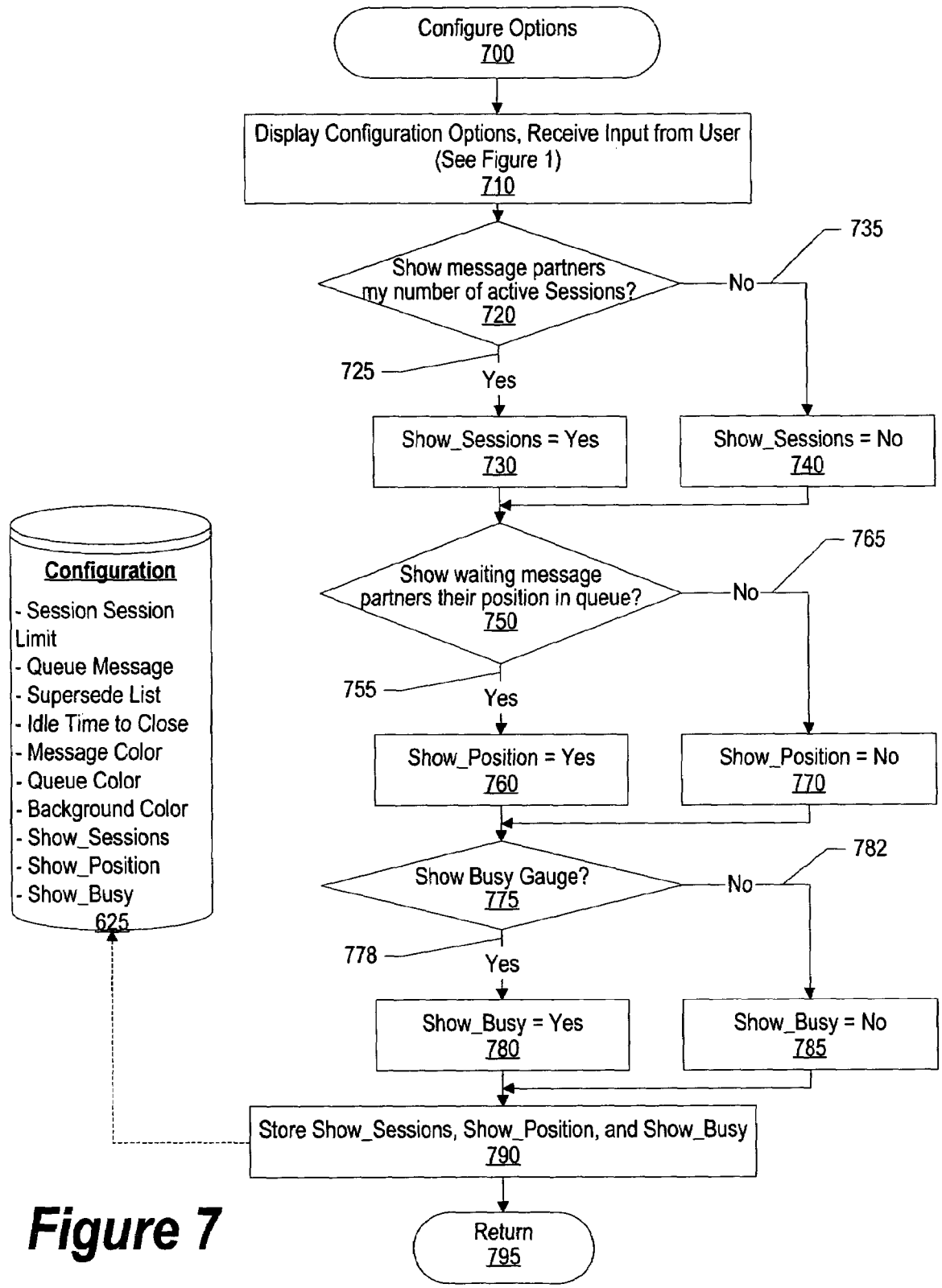
FIG. 7 is a flowchart showing steps taken in configuring options that pertain to a user's instant messaging application.

Various configuration options are then received and stored (predefined process 690, see FIG. 7 and corresponding text for processing details). Processing thereafter returns at 695.

FIG. 7 is a flowchart showing steps taken in configuring options that pertain to a user's instant messaging application. Processing commences at 700 whereupon, at step 710, available configuration options are displayed to the user (see FIG. 1 and corresponding text for details regarding the displayed options on the configuration panel) A determination is made as to whether the user has opted to show his or her instant messaging partners the number of currently active instant messaging sessions active with the user (decision 720). If the user opted to show the number of sessions to his or her message partners, decision 720 branches to "yes" branch 725 whereupon, at step 730, a flag is set indicating that the number of active sessions should be shared (Show_Chats=Yes). On the other hand, if the user did not opt to share this information, decision 720 branches to "no" branch 735 whereupon, at step 740, the flag is not set (Show_Chats=No), thereby indicating that the number of active sessions should not be shared.

A determination is made as to whether the user has opted to show waiting message partners their position in the user's queue (decision 750). Using the example shown in FIG. 1, if the user already has four active sessions and three people waiting for an instant messaging session, then the three people waiting for a session could be informed of their position in the wait queue (i.e., first, second, and third). Providing this information to users may enable the waiting users to decide to attempt a instant messaging session at another time, send the user a message, or wait for an available session. This information may also provide the waiting users with an approximate amount of time until a session is available. For example, if the user is first or second in the queue, it may be a relatively short amount of time until a session is available, but if the waiting user finds out that he or she is thirtieth in the queue, the amount of time will likely be much longer until a session is available.

Returning to FIG. 7, if the user opted to show waiting message partners their position in the queue, decision 750 branches to "yes" branch 755 and a flag is set (Show_Position=Yes) at step 760. On the other hand, if the user did not opt to show waiting message partners their position in the queue, decision 750 branches to "no" branch 765 and, at step 770, the flag is not set (Show_Position=No).

A determination is made as to whether the user opted to show his or her instant messaging session partners a busy gauge indicating the activity level of the user (decision 775). If the user opted to show partners a busy gauge, decision 775 branches to "yes" branch 778 whereupon, at step 780, a flag is set to provide the busy gauge to others (Show_Busy=Yes). On the other hand, if the user opted to not provide his or her activity level to others, decision 775 branches to "no" branch 782 whereupon, at step 785, the flag is not set (Show_Busy=No).

At step 790, the various flags are stored in configuration data store 625. Processing thereafter returns at 795.

FIG. 8 is a flowchart showing the steps taken in executing an instant messaging application with a queue limit. Processing commences at 800 whereupon, at step 805, the user invokes the instant messaging application. At step 810, the instant messaging application reads the configuration settings stored in configuration data store 625 and initializes the current number of sessions to zero.

An event processor receives events at step 815 and a series of decisions follows in order to handle the event. A determination is made as to whether the received event was a request for a new instant messaging session (decision 820). If the event was for a new instant messaging session, decision 820 branches to "yes" branch 822 whereupon the new instant messaging request is processed (predefined process 825, see FIG. 9 and corresponding text for processing details), and processing loops back to receive the next event.

If the event was not for a new instant messaging session, decision 820 branches to "no" branch 828 whereupon another determination is made as to whether the event is to terminate an existing instant messaging session (decision 830). If the event is to terminate an existing instant messaging session, decision 830 branches to "yes" branch 832 whereupon the termination of the instant messaging session is processed (predefined process 835, see FIG. 12 and corresponding text for processing details), and processing loops back to receive the next event.

If the event was not for terminating an instant messaging session, decision 830 branches to "no" branch 838 whereupon another determination is made as to whether the event is that an existing instant messaging session is inactive (decision 840). An inactive instant messaging session is a session that has not been used (i.e., no messages have been created or received for the session) for a certain amount of time, where the amount of time is configurable by the user. If the event is that an existing instant messaging session is inactive, decision 840 branches to "yes" branch 842 whereupon the inactive instant messaging session is processed (predefined process 845, see FIG. 13 and corresponding text for processing details), and processing loops back to receive the next event.

If the event was not for handling an inactive instant messaging session, decision 840 branches to "no" branch 848 whereupon another determination is made as to whether the event is that an user has requested to view a list of instant messaging activity (decision 850). FIGS. 2 and 4 show examples of screen displays that detail instant messaging activity. The instant messaging activity list shows the user the active sessions, instant messaging partners that are waiting for a new instant messaging session, instant messaging partners that are not available, and instant messaging partners that have left a message for the user. If the event is a request to view instant messaging activity, decision 850 branches to "yes" branch 852 whereupon the instant messaging list is displayed for the user (predefined process 855, see FIG. 14 and corresponding text for processing details), and processing loops back to receive the next event.

If the event was not a request to view instant messaging activity, decision 850 branches to "no" branch 858 whereupon another determination is made as to whether the user has requested that the instant messaging application be terminated (decision 860). The instant messaging application can be terminated by the user closing the instant messaging application or by the user shutting down the computer system. If the event is not a request to exit the instant messaging application, decision 850 branches to "no" branch 852 whereupon another instant messaging event is handled (step 865), and processing loops back to receive the next event. Events continue to be processed until the event is to exit the instant messaging application, at which point decision 860 branches to "yes" branch 890 and instant messaging application processing terminates at 895.

Figure 9:
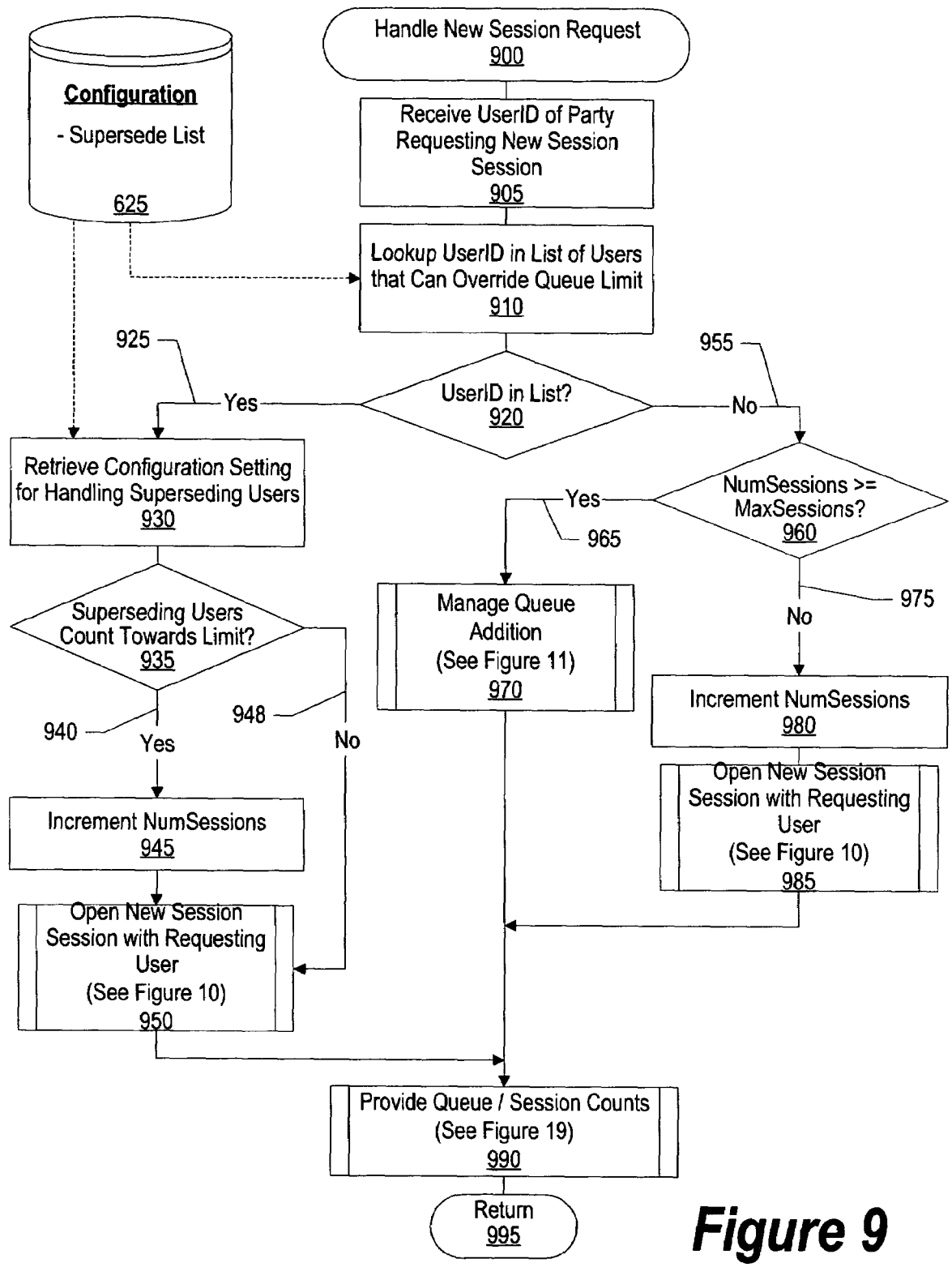
FIG. 9 is a flowchart showing the steps taken in handling a new instant messaging session request.

FIG. 9 is a flowchart showing the steps taken in handling a new instant messaging session request. Processing commences at 900 whereupon, at step 905, the user's instant messaging application receives the user identifier of the instant messaging partner that is requesting a new instant messaging session. At step 910, the user's instant messaging application tries to find the requestor's user identifier within the list of users that are allowed to supersede the user's instant messaging session limits. The list of users allowed to supersede the instant messaging limits is user-configurable and stored in configuration data store 625.

A determination is made as to whether the requestor's user identifier was found in the list of users that are allowed to supersede the instant messaging session limits. If the requestor's identifier was found, decision 920 branches to "yes" branch 925 to handle opening a new instant messaging session with the requester. First, at step 930, a configuration setting is retrieved that indicates whether a requestor that is found in the supersede list is counted towards the instant messaging session limit. This determination is made at decision 935. If the requestor counts toward the instant messaging session limit, decision 935 branches to "yes" branch 940 whereupon, at step 945, the number of instant messaging sessions is incremented by one. On the other hand, if the requester does not count towards the instant messaging session limit, decision 935 branches to "no" branch 948 bypassing step 945. In either case, however, a new instant messaging session is opened with the requesting user (predefined process 950, see FIG. 10 and corresponding text for processing details).

Returning to decision 920, if the requestor's user identifier was not found in the supersede list, decision 920 branches to "no" branch 955 whereupon a determination is made as to whether the current number of active instant messaging sessions is greater than or equal to the maximum number of sessions allowed by the user (decision 960). The amount of active sessions may be greater than the maximum number allowed if one or more requestors from the supersede list have active sessions and the user has opted not to count such users towards the limit on the maximum number of sessions. If the current number of active instant messaging sessions is greater than or equal to the maximum number of sessions allowed by the user, decision 960 branches to "yes" branch 965 whereupon processing occurs to manage a possible addition to the user's instant messaging wait queue (predefined process 970, see FIG. 11 and corresponding text for processing details). On the other hand, if the current number of active instant messaging sessions is not greater than or equal to the maximum number of sessions allowed by the user, decision 960 branches to "no" branch 975 whereupon, at step 980, the number of active instant messaging sessions is incremented and a new instant messaging session is opened with the requesting user (predefined process 985, see FIG. 10 and corresponding text for processing details).

Figure 19:
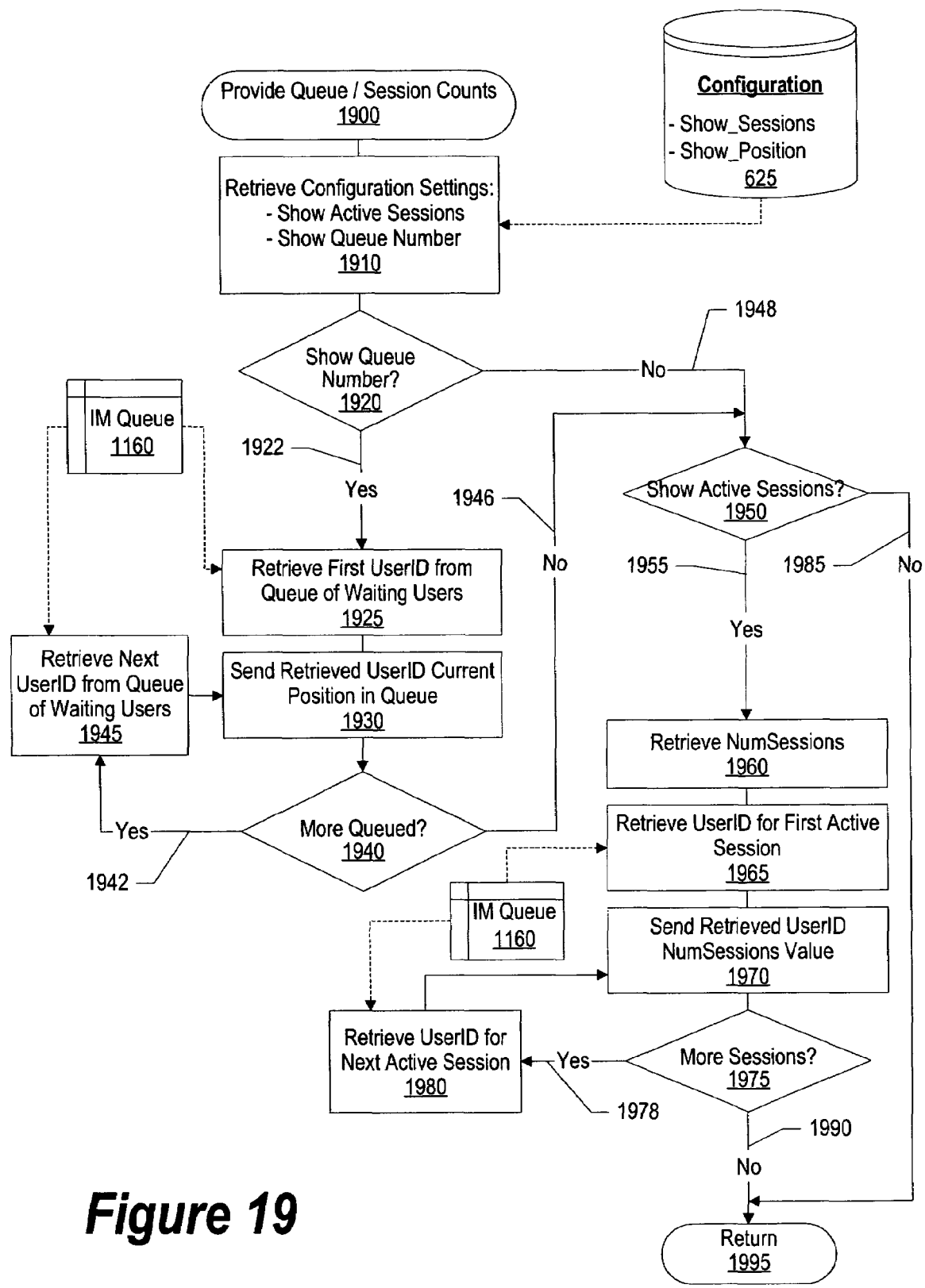
FIG. 19 is a flowchart showing the steps taken to provide queue and session counts.

After the requestor has been handled (i.e., either added to the wait queue or a new instant messaging session has been opened with the requester), queue and session counts are provided to the user's instant messaging partners (predefined process 990, see FIG. 19 and corresponding text for processing details). Processing thereafter returns at 995.

Figure 10:
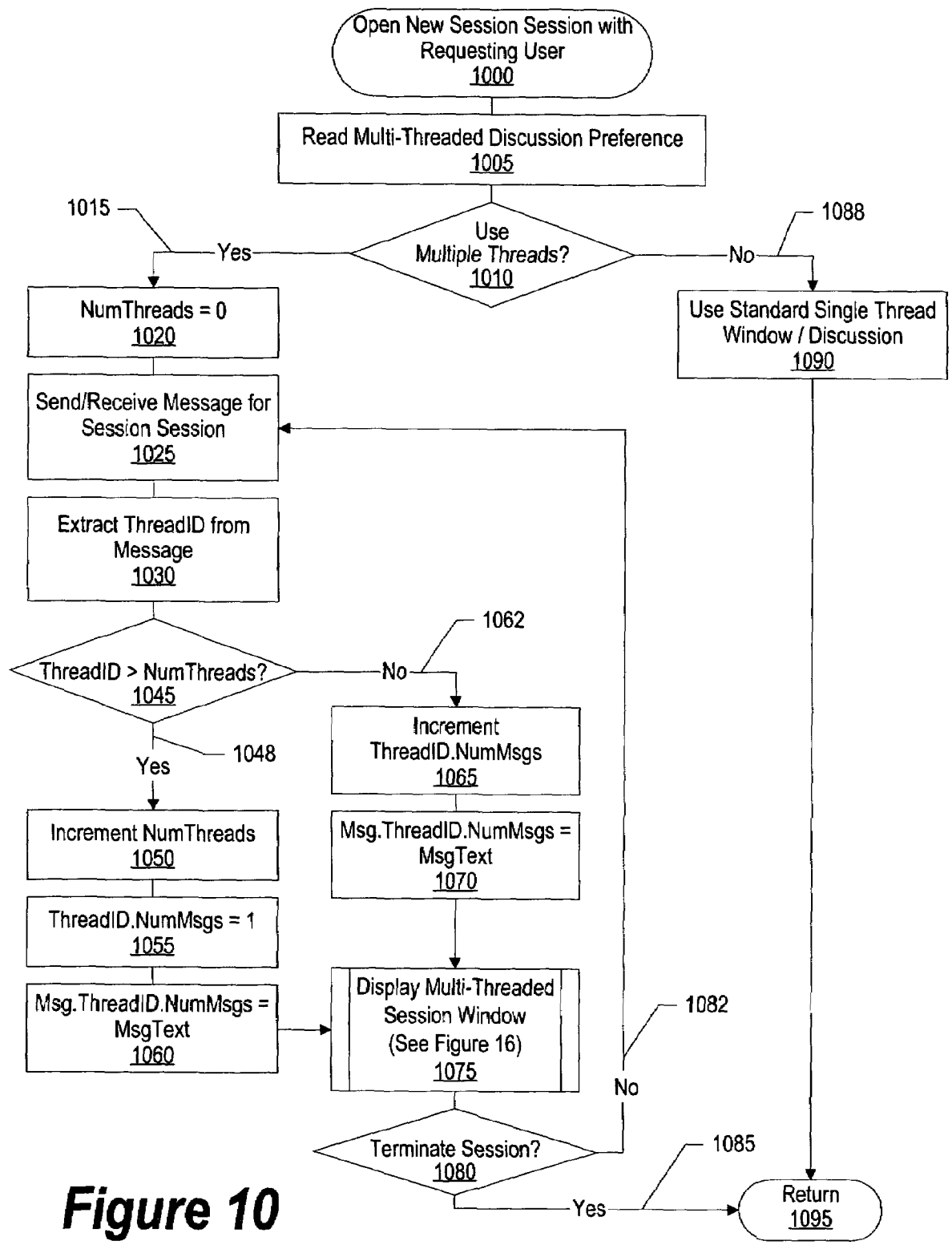
FIG. 10 is a flowchart showing the steps taken in opening a new instant messaging session with a requesting user.

FIG. 10 is a flowchart showing the steps taken in opening a new instant messaging session with a requesting instant messaging partner. Processing commences at 1000 whereupon, at step 1005, the instant messaging application reads the user's multi-threaded discussion preference from the configuration data store. A determination is made as to whether the user wishes to use multiple discussion threads for each instant messaging session (decision 1010).

If the user opted to use multiple discussion threads, decision 1010 branches to "yes" branch 1015 to start a multi-threaded instant messaging session.

The number of discussion threads is initialized to zero at step 1020. At step 1025, a first message is sent or received. A thread identifier is extracted from the message at step 1030. A determination is made as to whether the thread identifier is a number that is greater than the number of threads (decision 1045). If the thread identifier is greater than the number of threads (indicating a new discussion thread), decision 1045 branches to "yes" branch 1048 in order to process the new thread. The number of threads is incremented at step 1050 and the number of messages in this thread is initialized to one at step 1055. A new entry is added to a message array at step 1060 and set equal to the message text of the message that was sent or received.

Returning to decision 1045, if the thread identifier is less than or equal to the number of threads (indicating that the new message belongs to an existing discussion thread), then decision 1045 branches to "no" branch 1062 whereupon the number of messages in the discussion thread is incremented at step 1065, and a new entry is added to a message array at step 1070 and set equal to the message text of the message that was sent or received.

Figure 16:
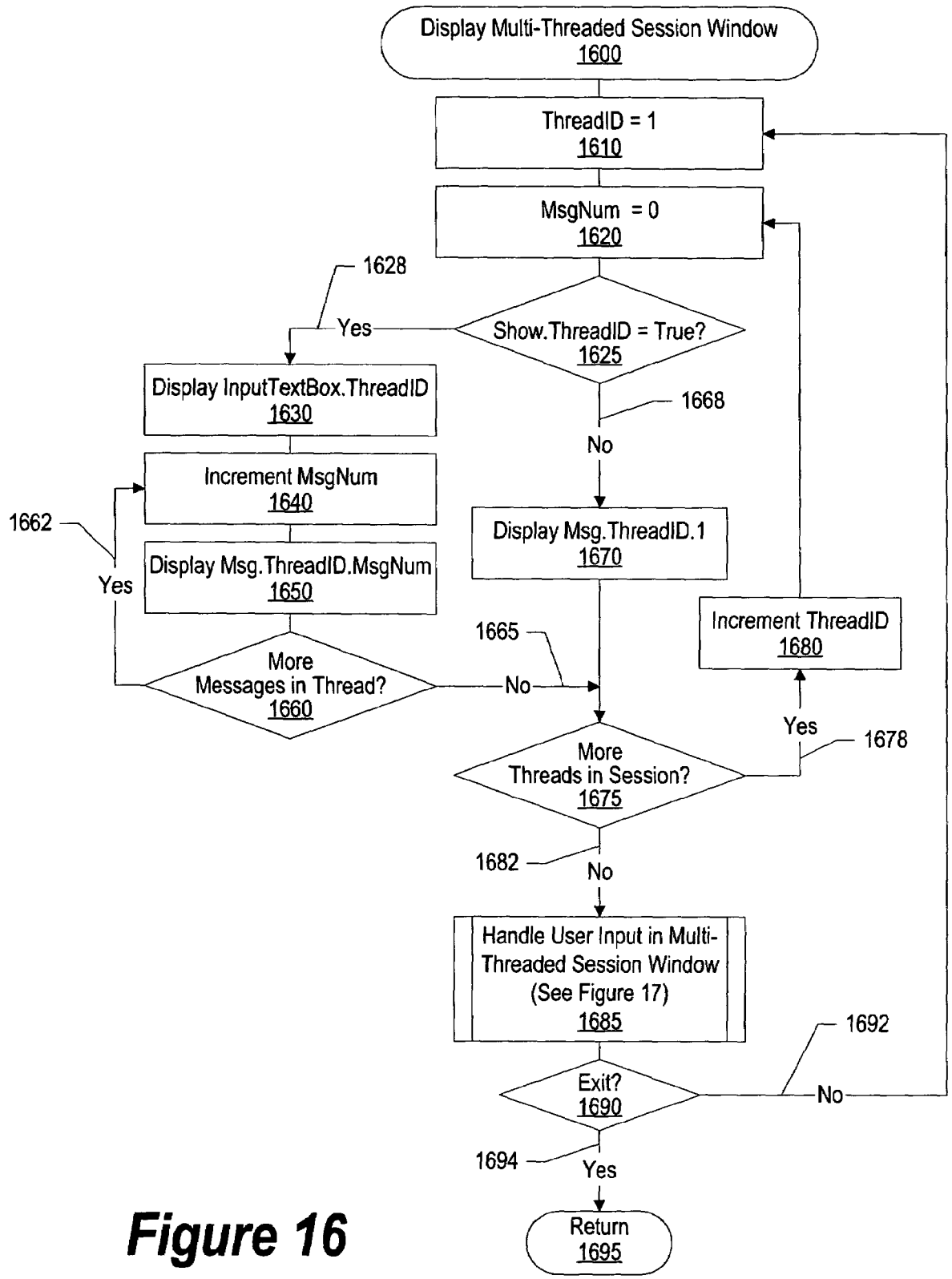
FIG. 16 is a flowchart showing the steps taken to display an instant messaging session with multiple threads.

Once the message text has been added to the appropriate message array, the multi-threaded instant messaging session window is displayed (predefined process 1075, see FIG. 16 and corresponding text for processing details). A determination is made as to whether the user has requested to terminate the instant messaging session (decision 1080). If the instant messaging session has not been terminated, decision 1080 branches to "no" branch 1082 which loops back to receive the next message for the multi-threaded instant messaging session. This looping continues until the session is terminated, at which time decision 1080 branches to "yes" branch 1085 and processing returns at 1095.

Returning to decision 1010, if the user is not using multi-threaded instant messaging sessions, decision 1010 branches to "no" branch 1088 whereupon a traditional single threaded instant messaging session is invoked for the chat session and processing returns at 1095.

Figure 11:
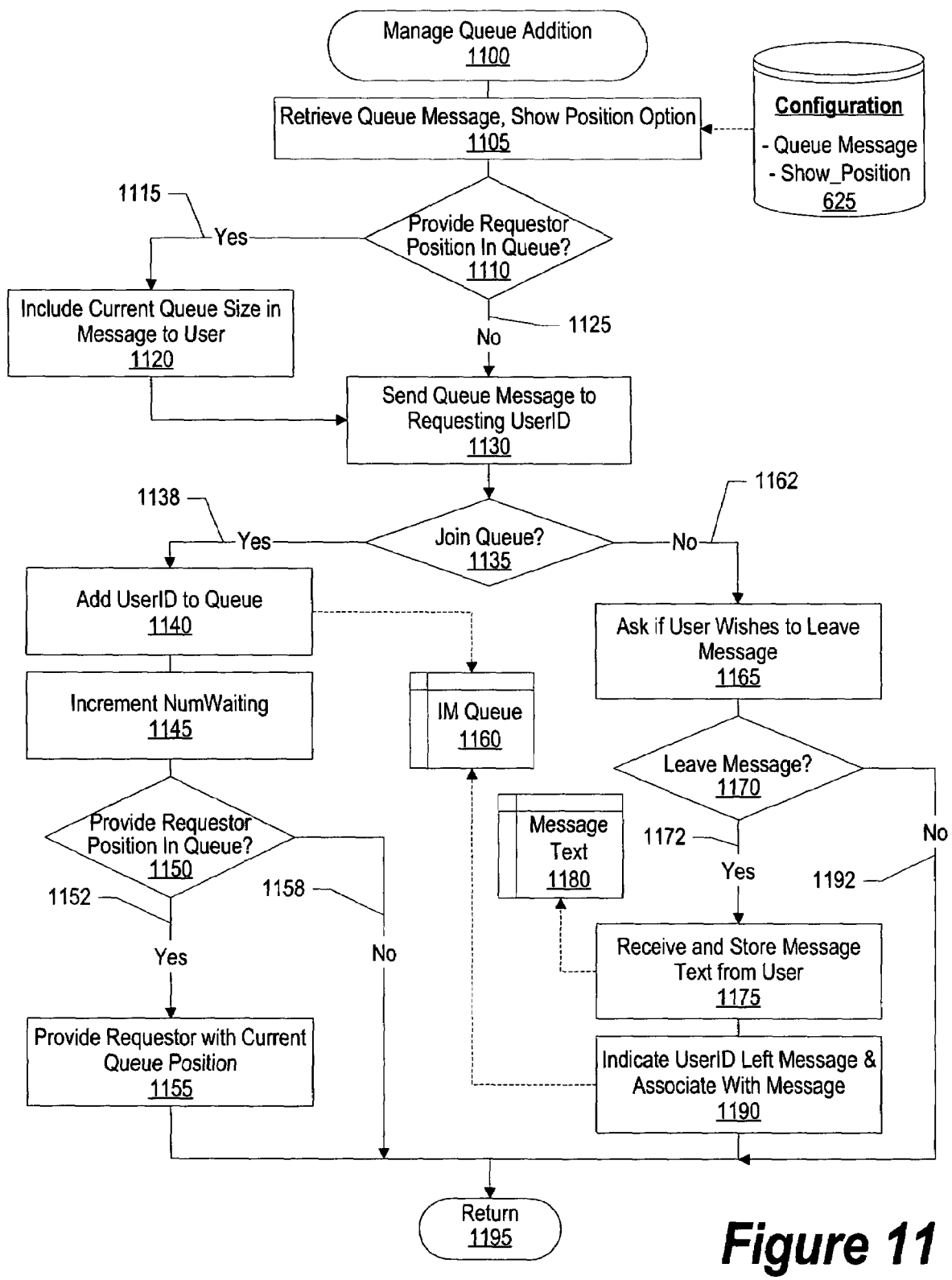
FIG. 11 is a flowchart showing the steps taken to manage additions to the instant messaging wait queue.

FIG. 11 is a flowchart showing the steps taken to manage additions to the instant messaging wait queue. Processing commences at 1100 whereupon, at step 1105, the queue message is retrieved from configuration data store 625 along with a user-configurable flag that indicates whether the user's instant messaging partners are provided with their position in the user's wait queue. A queue message is a user-configurable message that may, for example, inform the requester that the user is currently busy and invite the requester to wait for an available instant messaging session.

A determination is made as to whether the user's instant messaging partners are provided with their position in the wait queue based upon the retrieved flag (decision 1110). If the user has opted to share queue size information, then decision 1110 branches to "yes" branch 1115 whereupon the user's current queue size is included in the user's queue message at step 1120. On the other hand, if the user has opted to not share queue size information, then decision 1110 branches to "no" branch 1125 bypassing step 1120. At step 1130 the queue message (either with or without queue size information) is sent to the requestor. The requestor sends a reply regarding whether the requestor wishes to join the user's wait queue. A determination is made as to whether the requestor has opted to join the wait queue (decision 1135). If the requestor opts to join the wait queue, then decision 1135 branches to "yes" branch 1138 to add the requestor to the queue. At step 1140, the requestor's user identifier is added to wait queue 1160 and, at step 1145, the number of requestors waiting for an instant messaging session is incremented. A determination is made, based upon the retrieved Show_Position flag, as to whether to provide the requestor with his or her position in the queue (decision 1150). If the user has opted to provide this information, decision 1150 branches to "yes" branch 1152 whereupon, at step 1155, the requestor is provided with his or her position in the queue. On the other hand, if the user has opted to not provide this information, decision 1150 branches to "no" branch 1158 bypassing step 1155. Processing thereafter returns at 1195.

Returning to decision 1135, if the requester decides not to join the user's wait queue, decision 1135 branches "no" branch 1162 whereupon, at step 1165, the requester is asked if he or she wishes to leave a text message. A determination is made as to whether the requestor opted to leave a text message (decision 1170). If the requestor opted to leave a text message, decision 1170 branches to "yes" branch 1172 whereupon, at step 1175, the requestor's text message is received and stored in message memory area 1180. At step 1190, the user's instant messaging queue 1160 is updated to indicate that the requestor left a message and a pointer is included to associate the requester with the text message stored in memory 1180. Returning to decision 1170, if the requestor decided to not leave a message, decision 1170 branches to "no" branch 1192 bypassing steps 1175 and 1190. Processing thereafter returns at 1195.

Figure 12:
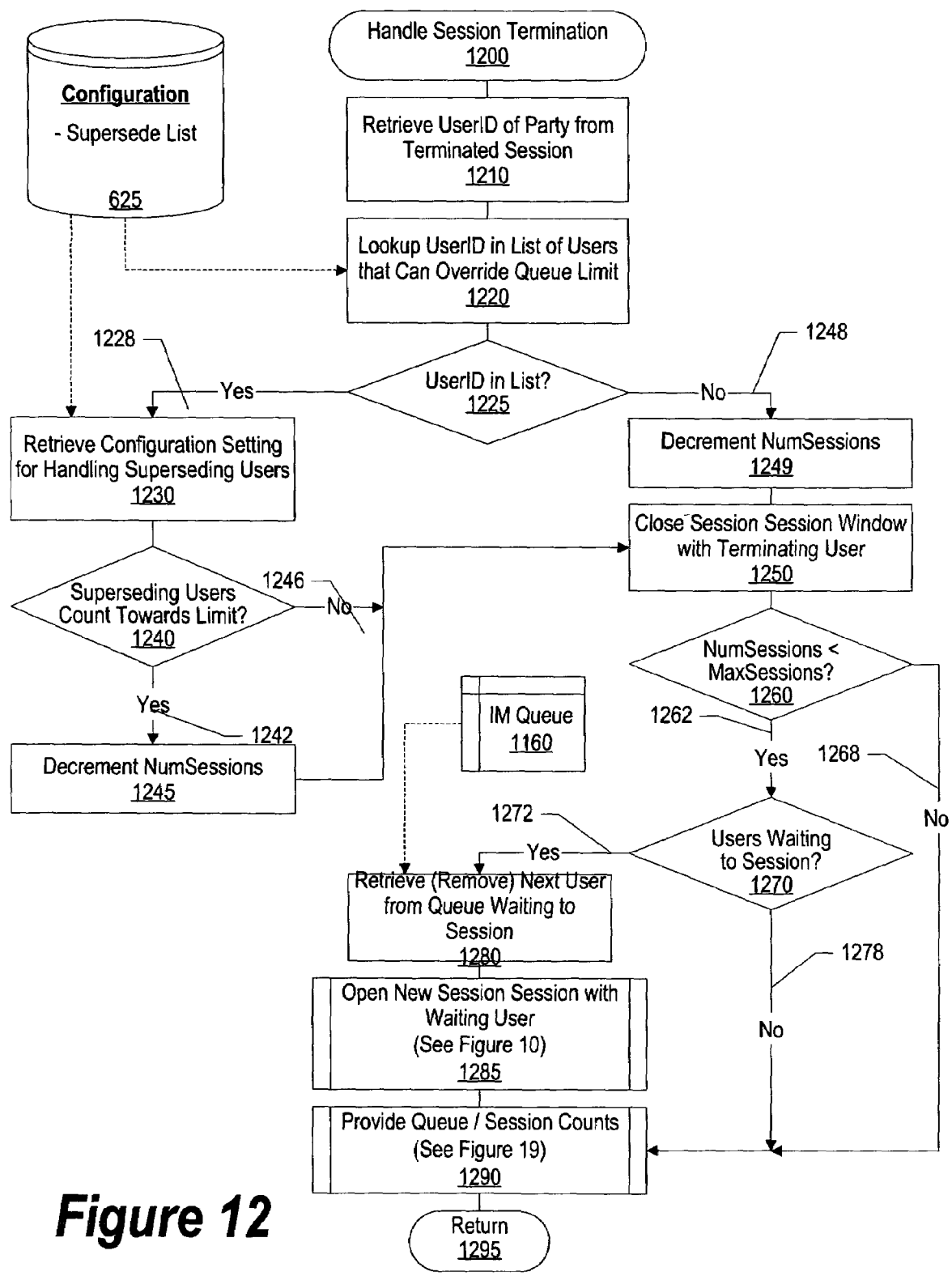
FIG. 12 is a flowchart showing the steps taken to terminate an instant messaging session.

FIG. 12 is a flowchart showing the steps taken to terminate an instant messaging session. Processing commences at 1200 whereupon, at step 1210, the user identifier of the party with whom the terminating instant messaging session is retrieved. At step 1220 the user's instant messaging application tries to find the requestor's user identifier within the list of users that are allowed to supersede the user's instant messaging session limits. The list of users allowed to supersede the instant messaging limits is user-configurable and stored in configuration data store 625.

A determination is made as to whether the requestor's user identifier was found in the list of users that are allowed to supersede the instant messaging session limits (decision 1225). If the requestor's identifier was found, decision 1225 branches to "yes" branch 1228 whereupon at step 1230, a configuration setting is retrieved from configuration data store 625 that indicates whether the requestor that is found in the supersede list was counted towards the instant messaging session limit. This determination is made at decision 1240. If the requestor was counted toward the instant messaging session limit, decision 1240 branches to "yes" branch 1242 whereupon, at step 1245, the number of instant messaging sessions is decremented by one. On the other hand, if the requestor does not count towards the instant messaging session limit, decision 1240 branches to "no" branch 1246 bypassing step 1245.

Returning to decision 1225, if the requestor's user identifier was not found in the list, then decision 1225 branches to "no" branch 1248 and decrements the number of active instant messaging sessions at step 1249. Regardless of whether the requestor's user identifier was found in the supersede list, the instant messaging session with the requestor is closed at step 1250. A determination is made as to whether the number of sessions is less than the maximum number of allowed sessions (decision 1260). If the number of sessions is less than the maximum number of sessions allowed (i.e., after the number of sessions was decremented at either steps 1245 or 1249), then decision 1260 branches to "yes" branch 1262 whereupon another determination is made as to whether there are currently other users waiting to have an instant messaging session with the user (decision 1270). If there are users waiting to have an instant messaging session, decision 1270 branches to "yes" branch 1272 whereupon the next user identifier that was queued in instant messaging queue 1160 is retrieved at step 1280. A new instant messaging session is then started with the waiting user (predefined process 1285, see FIG. 10 and corresponding text for processing details). Returning to decisions 1260 and 1270, if the number of sessions is greater than or equal to the maximum number allowed (decision 1260), or if there are no users waiting for an instant messaging session (decision 1270), then the decisions bypass steps 1280 and 1285 using "no" branches 1268 and 1278, respectively.

Queue and session counts are provided to the user's instant messaging partners (predefined process 1290, see FIG. 19 and corresponding text for processing details). Processing thereafter returns at 1295.

Figure 13:
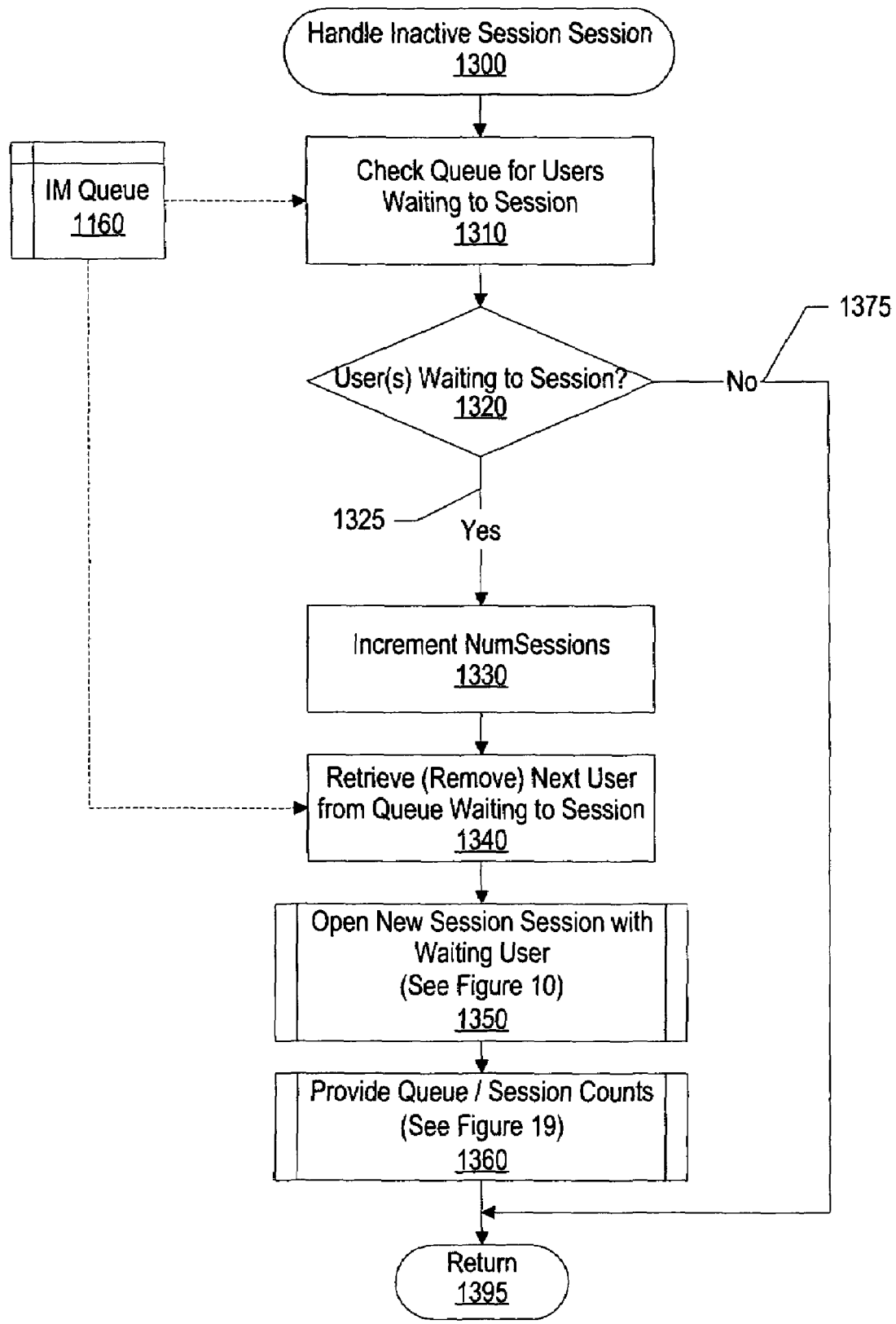
FIG. 13 is a flowchart showing the steps taken to handle an inactive instant messaging session.

FIG. 13 is a flowchart showing the steps taken to handle an inactive instant messaging session. Processing commences at 1300 when an inactive instant messaging session has been identified (see FIG. 8 which calls the processing shown in FIG. 13).

When an inactive instant messaging session has been identified, FIG. 13 checks to see if there are waiting instant messaging session partners that have requested an instant messaging session with the user (step 1310). This is performed by step 1310 checking instant messaging queue 1160 which includes a list of any waiting instant messaging partners. Based on this check, a determination is made as to whether there are one or more users waiting for an instant messaging session with the user (decision 1320). If there is at least one user waiting for an instant messaging session with the user, decision 1320 branches to "yes" branch 1325 whereupon steps are performed to add a new (active) instant messaging session with the waiting user.

The number of active instant messaging sessions is incremented at step 1330. The next user identifier that was queued in instant messaging queue 1160 is retrieved at step 1340. A new instant messaging session is then started with the waiting user (predefined process 1350, see FIG. 10 and corresponding text for processing details). As the number of queued and active sessions has now changed, the updated queue and session counts are provided to the user's instant messaging partners (predefined process 1360, see FIG. 19 and corresponding text for processing details). Processing thereafter returns at 1395.

Returning to decision 1320, if there are no instant messaging partners that are waiting for an active instant messaging session, decision 1320 branches to "no" branch 1375 bypassing steps 1330-1360. Processing thereafter returns at 1395.

Figure 14:
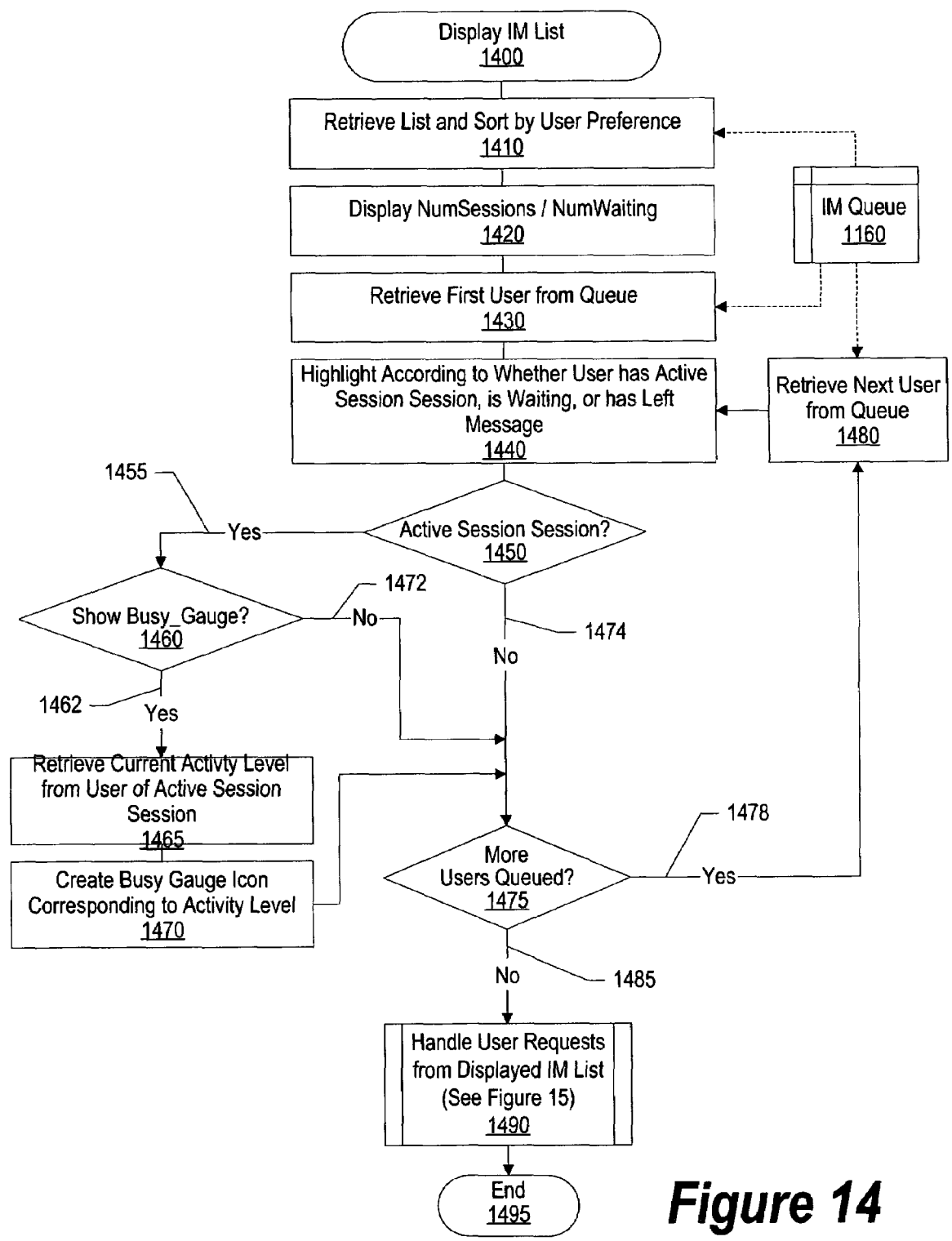
FIG. 14 is a flowchart showing the steps taken to display an instant messaging list.

FIG. 14 is a flowchart showing the steps taken to display an instant messaging list (for examples of an instant messaging lists see FIGS. 2 and 4). Processing commences at 1400 whereupon, at step 1410, the list of instant messaging partners (active, waiting, unavailable, and those that have left messages) is retrieved from instant messaging queue 1160 and sorted according to the user's preference. For example, the user may choose to have the instant messaging partners displayed alphabetically by name, or the user may choose to have the instant messaging partners grouped by category so that active instant messaging partners are displayed in one group, waiting instant messaging partners are displayed in a second group, instant messaging partners that have left messages are displayed in a third group, and instant messaging partners that are currently unavailable are displayed in a fourth group. At step 1420, the number of active sessions and the number of instant messaging partners waiting for a session is displayed.

The first user from the sorted queue is retrieved at step 1430. The user's information is written to the display and highlighted according to whether the retrieved user has an active session, is waiting for an instant messaging session, or has left a message at step 1440.

A determination is made as to whether the retrieved partner has an active instant messaging session with the user (decision 1450). If the retrieved partner has an active instant messaging session with the user, decision 1450 branches to "yes" branch 1455 whereupon a determination is made as to whether the user has opted to view a busy gauge that indicates the partner's activity level (decision 1460) based upon settings in the user's configuration (this option is shown being configured at the bottom of the screen in FIG. 1). If the user has opted to view the busy gauge, decision 1460 branches to "yes" branch 1462 whereupon, at step 1465 the current activity level for the instant messaging partner is retrieved and, at step 1470, a busy gauge icon is created and displayed that indicates the partner's activity level (see FIG. 4 and corresponding text for an example and description of various busy gauge icons depicting the activity level of various instant messaging partners). Returning to decision 1460, if the user did not opt to view the busy gauge, decision 1460 branches to "no" branch 1472 whereupon steps 1465 and 1470 are bypassed. Returning to decision 1450, if the retrieved partner does not have an active instant messaging session with the user, decision 1450 branches to "no" branch 1474 bypassing the busy gauge processing shown in steps 1460 to 1470.

After the retrieved partner has been processed and highlighted accordingly, a determination is made as to whether there are more partners queued in instant messaging queue 1160 (decision 1475). If there are more partners queued, decision 1475 branches to "yes" branch 1478 whereupon the next partner is retrieved from the queue (step 1480) and processing loops back to display the retrieved partner and display a corresponding busy gauge if appropriate. This looping continues until all the partners in the queue have been processed, at which time decision 1475 branches to "no" branch 1485 whereupon the user interacts with the displayed list and the system handles the user's requests (predefined process 1490, see FIG. 15 and corresponding text for processing details). Processing thereafter ends at 1495.

Figure 15:
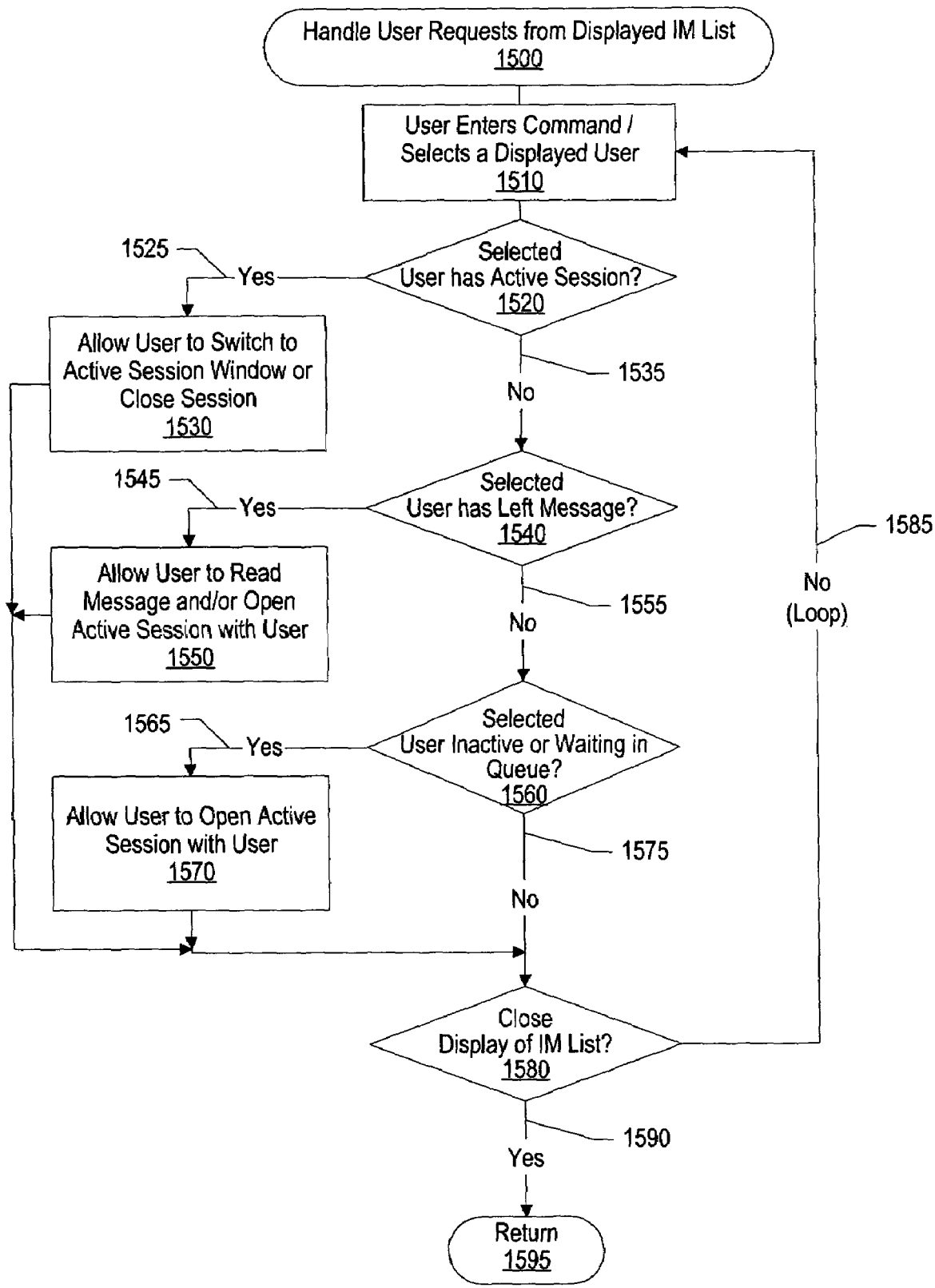
FIG. 15 is a flowchart showing the steps taken to handle requests received while the user interacts with the instant messaging list.

FIG. 15 is a flowchart showing the steps taken to handle requests received while the user interacts with the instant messaging list. Processing commences at 1500 whereupon, at step 1510, the user selects one of the displayed instant messaging partners or enters a command. A series of determinations is made to process the user's request.

A first determination is made as to whether the selected instant messaging partner currently has an active instant messaging session (decision 1520). If the selected instant messaging partner has an active session, decision 1520 branches to "yes" branch 1525 whereupon the user is allowed to switch to the active session or close (terminate) the session (step 1530).

If the user did not select a partner with an active session, decision 1520 branches to "no" branch 1535 whereupon another determination is made. This next determination is whether the selected partner has left a message (decision 1540). If the selected partner has left a message, decision 1540 branches to "yes" branch 1545 whereupon, at step 1550, the user is allowed to read the message left by the instant messaging partner and/or open a new active session with the partner.

If the user did not select an active partner or a partner that has left a message, decision 1540 branches to "no" branch 1555 whereupon a determination is made as to whether the selected user is inactive (i.e., not waiting for or engaged in an active session) or is waiting in the queue for an active session (decision 1560). If the user selected an inactive or waiting partner, decision 1560 branches to "yes" branch 1565 whereupon the user is allowed to open a new active instant messaging session with the selected partner (i.e., initiate a new session with an inactive user or grant a waiting session with a new session). If the user did not select a partner (active, one who left a message, waiting, or inactive), decision 1560 branches to "no" branch 1575.

After any partner-directed processing has taken place, a determination is made as to whether the user has requested to close the displayed instant messaging list (decision 1580). If the user has not requested to close the displayed instant messaging list, decision 1580 branches to "no" branch 1585 and processing loops back to process the next user request. This looping continues until the user requests that the display of the instant messaging list be closed, at which point decision 1580 branches to "yes" branch 1590 and processing returns at 1595.

FIG. 16 is a flowchart showing the steps taken to display an instant messaging session with multiple threads. Processing commences at 1600 whereupon, at step 1610, the thread identifier is initialized to one and, at step 1620, the message number for the message within the thread is initialized to zero.

A determination is made as to whether the view of this particular discussion thread has been collapsed (Show.ThreadID=False) or expanded (Show.ThreadID=True) at decision 1625. If the view of this discussion thread has been expanded, decision 1625 branches to "yes" branch 1628 whereupon, at step 1630, an input textbox is displayed so that the user can enter text for this discussion thread. The message number is incremented (step 1640) and the message corresponding to this thread identifier and message number is displayed at step 1650. A determination is made as to whether there are more messages in the thread (decision 1660). If there are more messages in the thread, decision 1660 branches to "yes" branch 1662 which loops back to increment the message number and display the next message for the thread. This looping continues until there are no more messages to write for this thread identifier, at which point decision 1660 branches to "no" branch 1665.

Returning to decision 1625, if the view of this discussion thread has been collapsed, decision 1625 branches to "no" branch 1668 whereupon, at step 1670, the first message of the collapsed discussion thread is displayed so that the user can view one line of the thread in order to be able to decide whether to expand the collapsed thread and view further messages.

After the discussion thread has been displayed (either in collapsed or expanded fashion), a determination is made as to whether there are more threads in the session (decision 1675). If there are more threads in the session, decision 1675 branches to "yes" branch 1678 whereupon, at step 1680, the thread identifier is incremented and processing loops back to display the next discussion thread. This looping continues until all the threads in the session have been displayed, at which point decision 1675 branches to "no" branch 1682.

Figure 17:
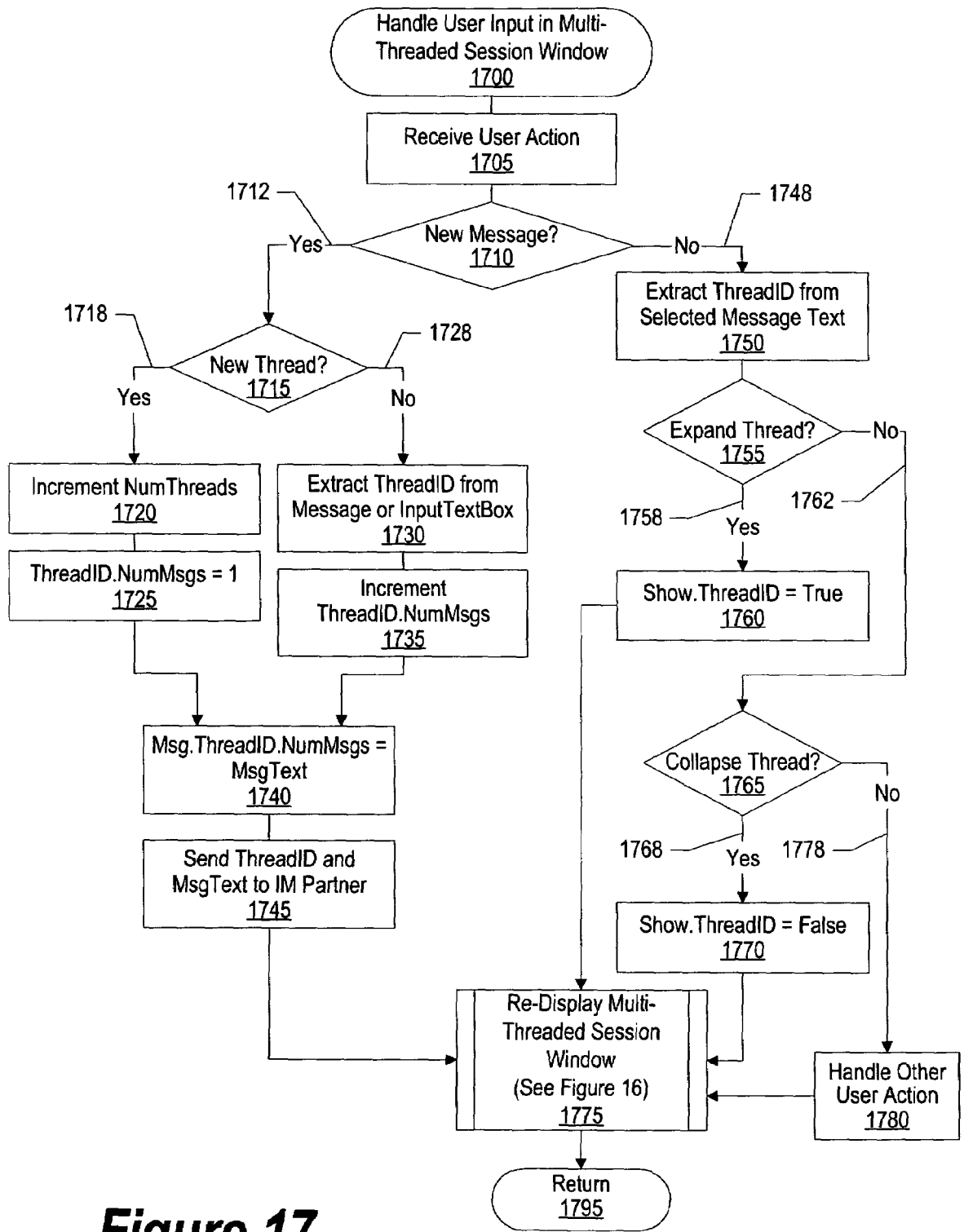
FIG. 17 is a flowchart showing the steps taken to handle user input while the user interacts with the multi-threaded instant messaging session interface.

The user's interaction with the multi-threaded instant messaging session display is handled (predefined process 1685, see FIG. 17 and corresponding text for processing details). A determination is made as to whether the user has opted to exit the multi-threaded instant messaging session (decision 1690). If the user has not opted to exit the session, decision 1690 branches to "no" branch 1692 which loops back to the beginning to re-paint the multi-threaded session display. Processing of the multi-threaded session display continues until the user exits the session, at which point decision 1690 branches to "yes" branch 1694 and processing ends at 1695.

FIG. 17 is a flowchart showing the steps taken to handle user input while the user interacts with the multi-threaded instant messaging session interface. Processing commences at 1700 when a user action is received at step 1705. A determination is made as to whether a new message has been received from either the message partner or from the user (decision 1710). If a new message was received, decision 1710 branches to "yes" branch 1712 whereupon another determination is made as to whether the new message is starting a new discussion thread or is a message for an existing discussion thread (decision 1715). If the message is for a new thread, decision 1715 branches to "yes" branch 1718 whereupon the number of discussion threads is incremented at step 1720 and the number of messages in the new thread is initialized to one at step 1725. On the other hand, if the message is for an existing discussion thread, decision 1715 branches to "no" branch 1728 whereupon the thread identifier is extracted from the message or from the input text box at step 1730, and the number of messages in the discussion thread is incremented at step 1735.

At step 1740, the message text is stored in an array that stores the messages for each thread. If the message is being sent from the user to the user's message partner, the thread identifier and the message text is sent to the instant messaging partner at step 1745. The user's multi-threaded instant messaging display is repainted to display the message text (predefined process 1775, see FIG. 16 and corresponding text for processing details).

Returning to decision 1710, if the action is not a new message for either a new or existing discussion thread, decision 1710 branches to "no" branch 1748 whereupon, at step 1750, the thread identifier is extracted from the message text selected by the user. A determination is made as to whether the user has opted to expand the selected thread (decision 1755). If the user has opted to expand the selected thread, decision 1755 branches to "yes" branch 1758 whereupon, at step 1760, a variable is set to expand the selected thread (Show.ThreadID=True) and the multi-threaded instant messaging display is repainted in order to expand the selected thread (predefined process 1775).

Returning to decision 1755, if the action was not to expand the selected thread, then decision 1755 branches to "no" branch 1762 whereupon a determination is made as to whether the user has opted to collapse the selected thread (decision 1765). If the user has opted to expand the selected thread, decision 1765 branches to "yes" branch 1768 whereupon, at step 1770, a variable is set to collapse the selected thread (Show.ThreadID=False) and the multi-threaded instant messaging display is repainted in order to collapse the selected thread (predefined process 1775). If the user did not opt to expand or collapse the thread, decision 1765 branches to "no" branch 1778 whereupon the user action is handled at step 1780 and the multi-threaded instant messaging window is re-displayed (predefined process 1775). After the new message or other user action has been handled, processing returns to the calling procedure at 1795.

Figure 18:
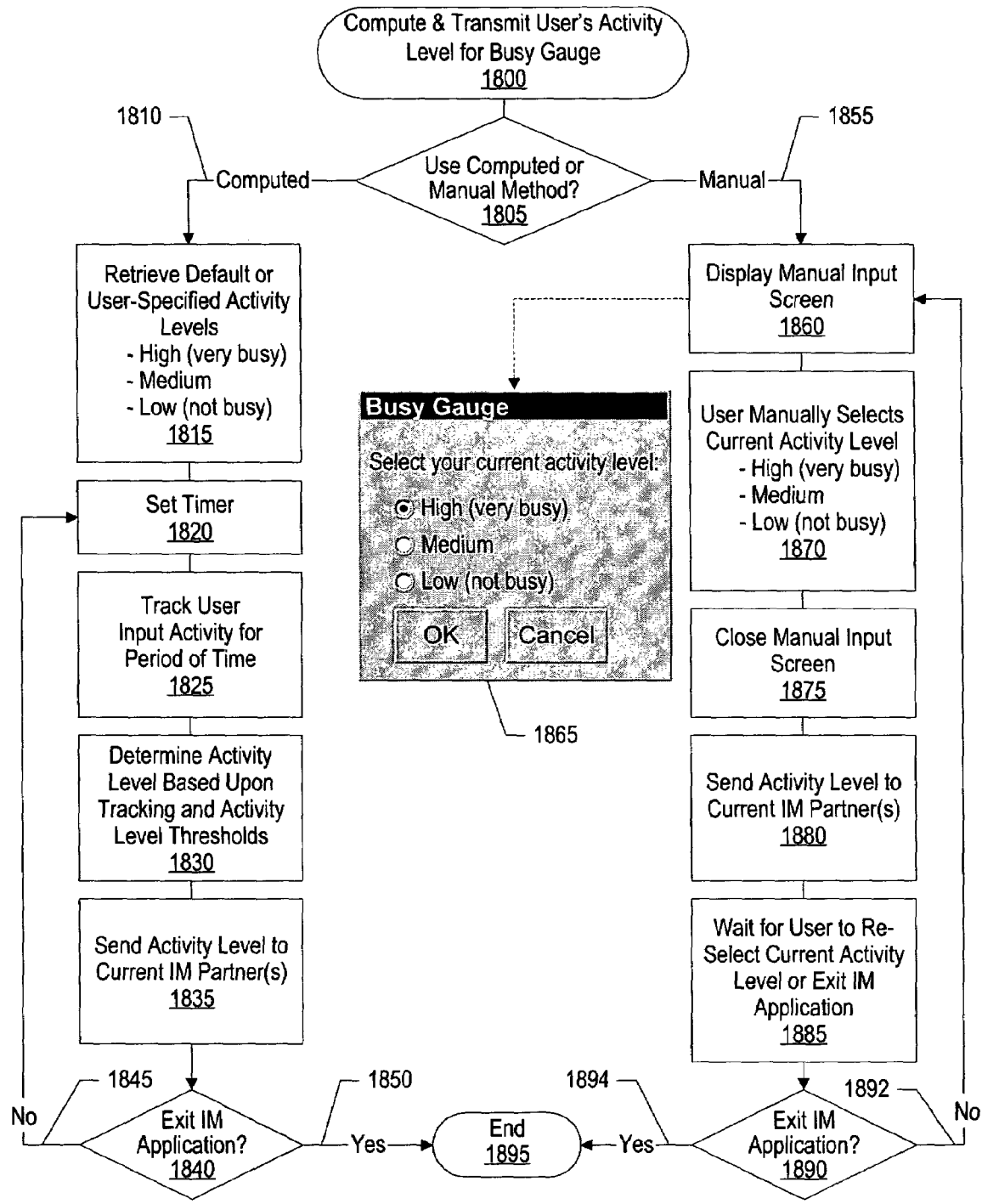
FIG. 18 is a flowchart showing the steps taken to compute and transmit a user's activity level using a busy gauge.

FIG. 18 is a flowchart showing the steps taken to compute and transmit a user's activity level using a busy gauge. Processing commences at 1800 whereupon a determination is made as to whether the user has opted to use a computed or manual method of identifying the user's activity level (decision 1805). If the user has opted to use the computed method, decision 1805 branches to "computed" branch 1810 to compute and transmit the activity level.

At step 1815, activity levels are retrieved. For example, thresholds may be in place so that if the user averages over 100 inputs per minute the user's activity level is considered "high," if the user averages between 25 and 99 input actions per minute the activity level is "medium," and if the user averages fewer than 25 input actions per minute, the activity level is "low." At step 1820 a timer is set to begin tracking the user's input. The user's input activity (e.g., keyboard, mouse, voice, etc.) is traced for a period of time at step 1825. Once the activity has been tracked for a period of time, at step 1830 the user's activity level is determined by comparing the activity metrics with the threshold levels that were retrieved in step 1815. Once the user's activity level has been determined, at step 1835 the activity level is sent to the user's current instant messaging partners. A determination is made as to whether the user has exited the instant messaging application (decision 1840). Processing continues to periodically gather and track the user's activity level by decision 1840 branching to "no" branch 1845 until the user exits the instant messaging application. When the user exits the instant messaging application, decision 1840 branches to "yes" branch 1850 and processing ends at 1895.

Returning to decision 1805, if the user opted to use a manual method to convey his or her activity level, decision 1850 branches to "manual" branch 1855 whereupon, at step 1860, manual input dialog screen 1865. As shown in input dialog screen 1865, the user can choose whether his current activity level is high, medium, or low (step 1870). Once the activity level is selected, the dialog screen is closed (step 1875) The selected activity level is sent to the user's current instant messaging partners at step 1880. The system waits for the user to reselect a different activity level or exit the instant messaging application at step 1885. A determination is made as to whether the user has exited the instant messaging application or wishes to reselect a different activity level (decision 1890). If the user wishes to reselect a different activity level, decision 1890 branches to "no" branch 1892 which branches to "no" branch 1892 to allow the user to reselect his or her activity level. This continues until the user exits the instant messaging application, at which point decision 1890 branches to "yes" branch 1894 and processing ends at 1895.

FIG. 19 is a flowchart showing the steps taken to provide queue and session counts. Processing commences at 1900 whereupon, at step 1910, configuration settings are retrieved from configuration data store 625 that indicate whether the user has opted to show message partners the number of active instant messaging sessions (Show_Chats) and whether the user has opted to show waiting message partners their position in the user's instant messaging queue (Show_Position).

A determination is made as to whether the user has opted to provide waiting message partners with their position within the user's instant messaging queue (decision 1920). If the user has opted to provide instant messaging partners their position within the queue, decision 1920 branches to "yes" branch 1922 whereupon processing takes place to provide the partners with their respective queue positions. The identifier of the first instant messaging partner waiting for an instant messaging session is retrieved from instant messaging queue 1160 at step 1925. At step 1930, the retrieved partner is provided with his or her position in the queue as retrieved from instant messaging queue 1160. A determination is made as to whether there are more partners in the queue that are waiting for an instant messaging session (decision 1940). If there are more partners in the queue, decision 1940 branches to "yes" branch 1942 whereupon, at step 1945, the identifier of the next partner that is waiting for an instant messaging session is retrieved from instant messaging queue 1160 and processing loops back to send the retrieved partner his or her position in the queue. This looping continues until all waiting partners have been processed, at which point decision 1940 branches to "no" branch 1946. Returning to decision 1920, if the user did not opt to provide waiting partners with their position in the queue, decision 1920 branches to "no" branch 1948 bypassing the steps shown in steps 1925 through 1945.

A determination is made as to whether the user has opted to provide message partners with the number of active instant messaging sessions in which the user is currently engaged. If the user has opted to share the number of active instant messaging sessions, decision 1950 branches to "yes" branch 1955 to provide the session information. At step 1960, the number of instant messaging sessions is retrieved. The identifier of the partner corresponding to the first active instant messaging session is retrieved from instant messaging queue 1160 at step 1965. At step 1970, the number of sessions is transmitted to the retrieved partner. A determination is made as to whether there are more active sessions (decision 1975). If there are more active sessions, decision 1975 branches to "yes" branch 1978 whereupon, at step 1980, the identifier of the partner corresponding to the next active instant messaging session is retrieved from instant messaging queue 1160 and processing loops back to send the retrieved partner the number of session information. This looping continues until there are no more partners to process, at which point decision 1975 branches to "no" branch 1990 and processing returns at 1995. Returning to decision 1950, if the user opted to not provide partners with the number of active sessions, then decision 1950 branches to "no" branch 1985 bypassing steps 1960 through 1980 and processing returns at 1995.

Figure 20:
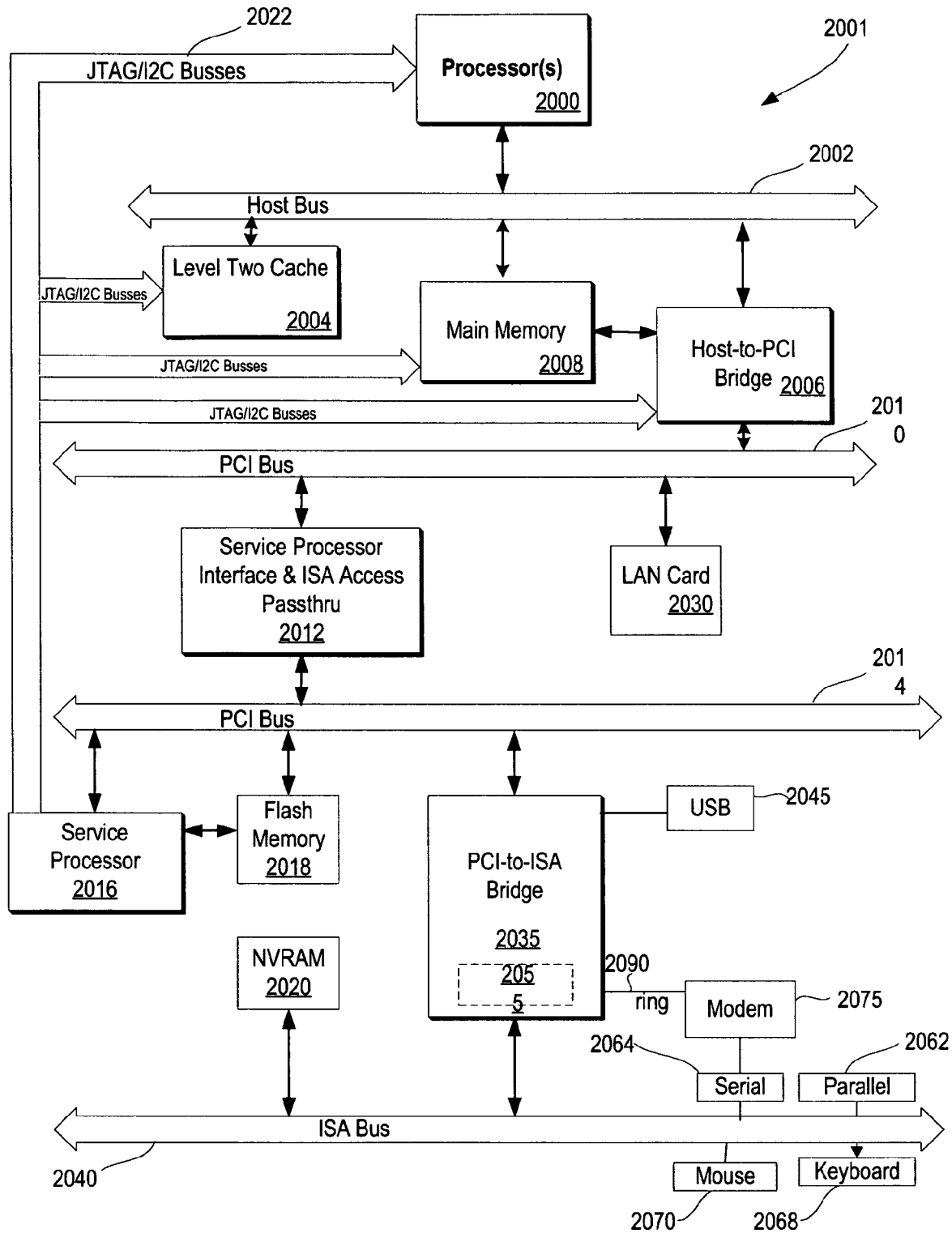
FIG. 20 is a block diagram of a computing device capable of implementing the present invention.

FIG. 20 illustrates information handling system 2001 which is a simplified example of a computer system capable of performing the computing operations described herein. Computer system 2001 includes processor 2000 which is coupled to host bus 2002. A level two (L2) cache memory 2004 is also coupled to host bus 2002. Host-to-PCI bridge 2006 is coupled to main memory 2008, includes cache memory and main memory control functions, and provides bus control to handle transfers among PCI bus 2010, processor 2000, L2 cache 2004, main memory 2008, and host bus 2002. Main memory 2008 is coupled to Host-to-PCI bridge 2006 as well as host bus 2002. Devices used solely by host processor(s) 2000, such as LAN card 2030, are coupled to PCI bus 2010. Service Processor Interface and ISA Access Pass-through 2012 provides an interface between PCI bus 2010 and PCI bus 2014. In this manner, PCI bus 2014 is insulated from PCI bus 2010. Devices, such as flash memory 2018, are coupled to PCI bus 2014. In one implementation, flash memory 2018 includes BIOS code that incorporates the necessary processor executable code for a variety of low-level system functions and system boot functions.

PCI bus 2014 provides an interface for a variety of devices that are shared by host processor(s) 2000 and Service Processor 2016 including, for example, flash memory 2018. PCI-to-ISA bridge 2035 provides bus control to handle transfers between PCI bus 2014 and ISA bus 2040, universal serial bus (USB) functionality 2045, power management functionality 2055, and can include other functional elements not shown, such as a real-time clock (RTC), DMA control, interrupt support, and system management bus support. Nonvolatile RAM 2020 is attached to ISA Bus 2040. Service Processor 2016 includes JTAG and I2C busses 2022 for communication with processor(s) 2000 during initialization steps. JTAG/I2C busses 2022 are also coupled to L2 cache 2004, Host-to-PCI bridge 2006, and main memory 2008 providing a communications path between the processor, the Service Processor, the L2 cache, the Host-to-PCI bridge, and the main memory. Service Processor 2016 also has access to system power resources for powering down information handling device 2001.

Peripheral devices and input/output (I/O) devices can be attached to various interfaces (e.g., parallel interface 2062, serial interface 2064, keyboard interface 2068, and mouse interface 2070 coupled to ISA bus 2040. Alternatively, many I/O devices can be accommodated by a super I/O controller (not shown) attached to ISA bus 2040.

In order to attach computer system 2001 to another computer system to copy files over a network, LAN card 2030 is coupled to PCI bus 2010. Similarly, to connect computer system 2001 to an ISP to connect to the Internet using a telephone line connection, modem 2075 is connected to serial port 2064 and PCI-to-ISA Bridge 2035.

While the computer system described in FIG. 20 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method comprising:
setting a maximum value of concurrent instant messaging session;
initiating a plurality of instant messaging session, each instant messaging session having a corresponding current instant messaging partner, wherein a number of instant messaging sessions is equal to the maximum value of concurrent instant messaging sessions;
receiving a first request for a first additional instant messaging session after the number of instant messaging session is equal to the maximum value of concurrent instant messaging sessions, the first request received from a first requesting instant messaging partner;
in response to receiving the first request, queuing an identifier corresponding to the first requesting instant messaging partner in a wait queue;
in response to queuing the identifier, determining that one of the plurality of initiated instant messaging session is an idle instant messaging session, the determination based upon comparing an idle time for the idle instant messaging session with an idle threshold value;
in response to the determining, terminating the idle instant messaging session;
in response to terminating the idle instant messaging session, decrementing the number of instant messaging session, the decrementing resulting in the number of instant messaging sessions being less than the maximum value of concurrent instant messaging sessions;
initiating the first additional instant messaging session with the first requesting instant messaging partner in response to the number of instant messaging sessions being less than the maximum value of concurrent instant messaging sessions, and
in response to initiating the first additional instant messaging session, incrementing the number of instant messaging sessions;
wherein the method is performed by one or more processors.

2. The method of claim 1 further comprising:
prior to queuing the identifier corresponding to the first requesting instant messaging partner, sending a message to the first requesting instant messaging partner indicating that the maximum value of concurrent instant messaging sessions has been reached; and
receiving a second request from the first requesting instant messaging partner to join the wait queue.

3. The method of claim 2 further comprising:
retrieving a size of the wait queue prior to sending the message; and
including the size of the wait queue in the message.

4. The method of claim 1 further comprising:
prior to queuing the identifier corresponding to the first requesting instant messaging partner, sending a message to the first requesting instant messaging partner indicating that the maximum value of concurrent instant messaging sessions has been reached;
receiving a second request from the first requesting instant messaging partner to leave a message, the second request including message text;
storing the message text in a memory area; and
notifying a user of the instant messaging sessions that the message was received from the first requesting instant messaging partner.

5. The method of claim 1 further comprising:
identifying a current number of initiated instant messaging sessions; and
providing one or more of the instant messaging partners corresponding to the plurality of initiated instant messaging sessions the current number of instant messaging sessions.

6. The method of claim 1 further comprising:
receiving a list of superseding instant messaging partners;
receiving a second request for a second additional instant messaging session after the number of instant messaging sessions is equal to the maximum value of concurrent instant messaging sessions, wherein the second request is from a second requesting instant messaging partner, the second requesting instant messaging partner being one of the superseding instant messaging partners; and
in response to receiving the second request, initiating the second additional instant messaging session with the second requesting instant messaging partner.

7. A computer implemented method comprising:
setting a maximum value of concurrent instant messaging sessions;
initiating a plurality of instant messaging sessions, each instant messaging session having a corresponding current instant messaging partner, wherein a number of instant messaging sessions is equal to the maximum value of concurrent instant messaging sessions;
receiving a first request for a first additional instant messaging session after the number of instant messaging sessions is equal to the maximum value of concurrent instant messaging sessions, the first request received from a first requesting instant messaging partner;
in response to receiving the first request, queuing an identifier corresponding to the first requesting instant messaging partner in a wait queue;
in response to queuing the identifier, determining that one of the plurality of initiated instant messaging sessions is an idle instant messaging session, the determining based upon comparing an idle time for the idle instant messaging session with an idle threshold value;
in response to determining that one of the plurality of initiated instant messaging sessions is an idle instant messaging session, initiating the first additional instant messaging session with the first requesting instant messaging partner;
in response to initiating the first additional instant messaging session, incrementing the number of instant messaging sessions, wherein the incrementing results in the number of instant messaging sessions becoming greater than the maximum value of concurrent instant messaging sessions;
wherein the method is performed by one or more processors.

8. The method of claim 7 further comprising:

receiving a list of superseding instant messaging partners;

receiving a second request for a second additional instant messaging session after the number of instant messaging sessions is equal to the maximum value of concurrent instant messaging sessions, wherein the second request is from a second requesting instant messaging partner, the second requesting instant messaging partner being one of the superseding instant messaging partners; and in response to receiving the second request, initiating the second additional instant messaging session with the second requesting instant messaging partner.

9. The method of claim 7 further comprising:

prior to queuing the identifier corresponding to the first requesting instant messaging partner, sending a message to the first requesting instant messaging partner indicating that the maximum value of concurrent instant messaging sessions has been reached; and receiving a second request from the first requesting instant messaging partner to join the wait queue.

10. The method of claim 9 further comprising:

retrieving a size of the wait queue prior to sending the message; and including the size of the wait queue in the message.

11. The method of claim 7 further comprising:

prior to queuing the identifier corresponding to the first requesting instant messaging partner, sending a message to the first requesting instant messaging partner indicating that the maximum value of concurrent instant messaging sessions has been reached;

receiving a second request from the first requesting instant messaging partner to leave a message, the second request including message text;

storing the message text in a memory area; and notifying a user of the instant messaging sessions that the message was received from the first requesting instant messaging partner.

12. The method of claim 7 further comprising:

identifying a current number of initiated instant messaging sessions; and providing one or more of the instant messaging partners corresponding to the plurality of initiated instant messaging sessions the current number of instant messaging sessions.

* * * * *